US007600692B2

(12) United States Patent
Call et al.

(10) Patent No.: US 7,600,692 B2
(45) Date of Patent: Oct. 13, 2009

(54) SYSTEMS AND METHODS FOR MANAGING AND USING PREPAID PURCHASING ACCOUNTS

(76) Inventors: William Call, 1610 Allred Rd., Afton, WY (US) 83110; Kristen Call, 1610 Allred Rd., Afton, WY (US) 83110

( * ) Notice: Subject to any disclaimer, the term of this patent is extended or adjusted under 35 U.S.C. 154(b) by 643 days.

(21) Appl. No.: 11/333,956

(22) Filed: Jan. 18, 2006

(65) Prior Publication Data

US 2006/0175396 A1 Aug. 10, 2006

Related U.S. Application Data

(63) Continuation-in-part of application No. 11/064,276, filed on Feb. 23, 2005, now Pat. No. 7,478,747.

(60) Provisional application No. 60/548,066, filed on Feb. 26, 2004.

(51) Int. Cl.
*G06K 13/00* (2006.01)
*G06K 13/24* (2006.01)

(52) U.S. Cl. .................. 235/483; 235/375; 235/379; 235/380; 705/69; 705/77

(58) Field of Classification Search .................. 235/483, 235/379, 375, 380, 381, 487; 705/39, 44, 705/72–79, 69
See application file for complete search history.

(56) References Cited

U.S. PATENT DOCUMENTS

| 5,329,589 | A | 7/1994 | Fraser et al. |
| 5,790,790 | A | 8/1998 | Smith et al. |
| 5,826,241 | A | 10/1998 | Stein et al. |
| 6,029,150 | A | 2/2000 | Kravitz |
| 6,192,407 | B1 | 2/2001 | Smith et al. |
| 6,227,447 | B1 | 5/2001 | Campisano |
| 6,351,739 | B1 | 2/2002 | Egendorf |
| 6,976,008 | B2 | 12/2005 | Egendorf |
| 7,103,577 | B2 | 9/2006 | Blair et al. |
| 7,309,003 | B2 | 12/2007 | Algiene et al. |
| 2002/0194122 | A1* | 12/2002 | Knox et al. .................. 705/39 |
| 2004/0225605 | A1* | 11/2004 | Rowe .......................... 705/39 |

OTHER PUBLICATIONS

"BP Amoco to Launch Net-Ready Gas Pumps," Computerworld, Jul. 31, 2000, 3 pages.

(Continued)

*Primary Examiner*—Edwyn Labaze
(74) *Attorney, Agent, or Firm*—Workman Nydegger

(57) ABSTRACT

The present invention extends to managing prepaid purchasing accounts and depositing funds therein. A kiosk and management system are connected over a network. The management system maintains purchasing accounts usable for multiple product or service purchases. To make a deposit, the consumer enters credentials at the kiosk, the credentials identifying a purchasing account. The consumer selects a payment method for making the deposit. For one or more payment methods (e.g., electronic check payment), the consumer selects a method to guarantee the deposit. The consumer also enters a deposit amount which is verified. Cash payments may be verified by an automated cash acceptor or a retail attendant. Credit card or debit card payments may be accepted by a card authorization network. Embodiments of the system also include debiting the purchasing account by a purchase amount. In addition, the purchasing account can be managed to view prior deposits and purchases.

44 Claims, 11 Drawing Sheets

OTHER PUBLICATIONS

"BP Launches Unmatched Innovation at Retail Sites," BP Press Office, Jul. 24, 2000, 2 pages.
"United States," BP website, date unknown, 2 pages.
"Driving Sales at the Pump," National Petroleum News, Jan. 2001, 11 pages.
"Rewarding Loyalty," National Petroleum News, May 2001, 7 pages.
"QuikTrip, CashWorks Team to Roll Out New Kiosk," Convenience Store News, May 4, 2005, 2 pages.
U.S. Appl. No. 10/162,050, filed Jun. 4, 2002, Dodson.
U.S. Appl. No. 60/295,984, filed Jun. 5, 2001, Dodson.

* cited by examiner

Select A Grade

| 87 | 91 | 93 |
|---|---|---|
| $1.779/gal. | $1.879/gal. | $1.979/gal. |

*Fig. 5C*

| File | Edit | View | Favorites | Tools | Help |
|---|---|---|---|---|---|

Address [ Management System URL ]

Intro ▶ | How it works ▶ | Locations ▶ | Company ▶ | Contact Us ▶ | Help ▶ | Sign-Up ▶ | Log-Out ▶

— 511

Account History

| My Account | Account Info. | Edit Account | Account History | Make Deposit |

— 513

Transaction Type [ ▼ ]

| | Month | Day | Year |
|---|---|---|---|
| From | May ▼ | 4 ▼ | 2004 ▼ |
| To | May ▼ | 4 ▼ | 2004 ▼ |

| Date & Time | Location | Purchases | Total Cost | Cost Breakdown ||| 
|---|---|---|---|---|---|---|
| | | | | Per/Unit Cost | Quantity | Cost |
| 05/04/04 8:57 am | Location #1 | Food - Produce Dairy | $8.67 | $3.49/lb $2.45/gal | 1.08 lb 2.00 gal | $3.77 $4.90 |
| 05/04/04 3:24 pm | Location #2 | Fuel - Regular Unleaded | $12.33 | $1.699/gal | 7.200 gal | $12.23 |
| 05/04/04 8:21 pm | Location #3 | Building Supplies - Hardware | $5.16 | $0.43/unit | 12 units | $5.16 |

*Fig. 5D*

Touch one of the deposit methods below to make a deposit.

| ATM or Debit Card | Credit or Check Card |
|---|---|
| * Additional Charges May Apply | * Additional Charges May Apply |
| Electronic Check | Cash or Check<br>* Additional Charges May Apply |

*Fig. 6B*

Touch one of the verification methods below to guarantee a deposit

| Delay availability of deposit amount. | Credit Card Guarantee | Third-party electronic check verification<br>* Additional Charges May Apply |
|---|---|---|

*Fig. 6C*

Enter the Amount of the Deposit for your Purchasing Account

Amount to Deposit: $ _____

Verification Code: __ __ __ __

*Fig. 6D*

SYSTEMS AND METHODS FOR MANAGING AND USING PREPAID PURCHASING ACCOUNTS

CROSS-REFERENCE TO RELATED APPLICATIONS

The present application is a continuation-in-part of U.S. patent application Ser. No. 11/064,276, filed Feb. 23, 2005 now U.S. Pat. No. 7,478,747 and entitled "Retail Sales and Dispensing Fuel Management System," which claims priority to U.S. Provisional Patent Application Ser. No. 60/548,066, filed Feb. 26, 2004, and entitled "FUEL MARKETING SYSTEM", each of which are herein incorporated by reference in their entirety.

BACKGROUND OF THE INVENTION

1. The Field of the Invention

The present invention relates to the purchase of goods and services and, more particularly, to payment for goods and services using a prepaid purchase account.

2. The Relevant Technology

At the majority of retail locations that sell petroleum, food, general merchandise, and other consumer products and services, a variety of traditional forms of payment are accepted, including cash, check, credit card, and debit card payment. Unfortunately, there are security and handling costs, fees, charges, and losses associated with each of these forms of payment.

For example, where cash is an accepted form of payment, associated costs and losses normally include the cost of the cashier being hired, trained, and supervised; accepting cash; giving back change (including too much change); pocketing money; and end-of-shift or other audits. In addition, attendants who accept cash may worry about cash shortages and may operate under the threat of being fired for such shortages.

Additional costs result from security. Such costs include, for example, capital outlays for safes and related security equipment, and costs for counting money, placing funds in the safe, theft losses (either in store or en route to a deposit), preparing deposit-slips, traveling to the bank, and bank service charges.

Credit card and debit card payments also include various similar and other costs. For instance, costs to the vendor include cashier costs, capital outlays for equipment and software, chargeback fees, card network fees, and rejected or bad card (e.g., Visa, Mastercard, etc.) fees.

The acceptance of checks includes many similar costs and fees as are associated with cash, as well as additional costs and fees. For instance, additional fees associated with accepting checks include third party check verification and guarantee fees, losses due to insufficient funds, collection costs (administrative, managerial and legal), cost of attendants accepting checks, inconvenience of slow lines due to customers preparing checks at the checkout stand, and adding check amounts for deposit slips. E-checks, however, are not subject to at least some of the costs and losses associated with in-store handling; however, the risks of losses due to insufficient funds and third party verification and guarantee fees still apply.

To reduce some of the costs normally associated with the checkout process, automated checkout systems may be employed. In this manner, automated checkout systems may reduce costs such as labor costs and potentially speed up the checkout process. However, cash outlays for cash acceptor machines at each checkout location, maintenance costs on these machines, the cost of loading change into the machine, and the usual costs of handling, securing, and banking money remain. Further, the use of traditional checks are not well suited for automated checkout systems, so checks must either be eliminated as an acceptable payment method, or an attendant must be present to accept the check payment. If accepted, the usual costs associated with check payments remain. Further, the fees, software, and equipment costs associated with credit card and debit card acceptance also remain.

When a credit card, debit card, check, or other type of payment is made, an attempt is often made to ensure that the purchaser is authorized to use the payment method. For instance, an attendant may require a government issued or other photo identification to verify the name on the check or credit card is the same as that presenting the card or check for the purchase. Similarly, when a debit card is presented, the user may be required to enter a confidential PIN number for authorization.

In addition, current payment methods are limited to payment at the time of the transaction. Accordingly, such forms of payment are accepted for only one purchase at a time. As a result, the costs associated with accepting cash, checks, and credit/debit cards applies to each individual purchase. As a consequence, costs and fees (e.g. security, handling, transaction, banking, etc.) borne by vendors and retailers for tank-at-a-time fuel purchases and individual food, merchandise, or service purchases paid for at the time of the purchase are greater than would be the associated costs and fees for a single payment sufficient for multiple fill-ups and multiple food, merchandise, or service purchases.

Additionally, merchants have typically not had a means for providing customers with recordkeeping tools to manage and keep automated records of purchases made with more than one form of payment (e.g., cash, checks, credit and debit cards). Depending on the form of payment some recordkeeping devices may be available, such as, for example, bank statements, online banking web sites, and credit card invoices. In addition, some petroleum companies offer credit card and fleet cards that provide recordkeeping services, but require a consumer to make all fuel purchases using the card. Further, merchants are typically charged for this service. However, no single recordkeeping device is available to customers who use multiple forms of payment at different times.

Although in some instances, means have been devised that reduce the cost of accepting traditional forms of payment, merchants pass the remaining costs, fees, charges, and losses on to their customers in the form of higher prices. Accordingly, as a result of present technology, customary payment methods used for fuel and other product or services purchases pass on the costs to the consumer and consumers are required to pay more for products and services than would otherwise be necessary if the costs, fees, charges and losses necessary with traditional payment methods were either reduced or eliminated.

Further, traditional forms of payment do not provide a mechanism for paying for more than one purchase at a time which, if available, could lower costs by spreading fees and costs over multiple purchases. In addition, typical payment mechanisms do not provide consumers with the ability to track purchases, establish budgets, and manage funds in a single, convenient interface for multiple payment methods. Accordingly, what would be advantageous are systems, methods, and computer program products that would further reduce or eliminate the monetary overhead associated with the acceptance of traditional payment methods, allow for the payment of multiple purchases at a time, and/or consolidate purchasing information into a manageable and convenient format for recordkeeping purposes.

BRIEF SUMMARY OF THE INVENTION

The foregoing problems with the prior state of the art are overcome by the principles of the present invention, which are directed towards methods, systems, and computer program products for allowing and managing the payment for sales of products and services.

A prepaid purchasing account is established and is maintained by an account management system. Embodiments of the account management system can include network (e.g., Internet) based payments into the prepaid purchasing account, either from a kiosk or from a personal computer. At a kiosk (e.g., located at a gas station, supermarket, restaurant, discount store, etc.), for example, account credentials are received through a user interface and correspond to a purchasing account. The purchasing account may be stored in a database at a retail location or at a remote account management system.

The kiosk submits the account credentials (e.g., across the Internet) to the account management system. The management system receives the account credentials from the kiosk. The account credentials may indicate an account holder's attempt to access an account to make a deposit, to make a purchase against the balance of the purchasing account, or to review the account status or history. Based on the account credentials, the management system identifies the corresponding purchasing account. Thereafter, the purchasing account can access account records and history, accept deposits into the account, and/or debit the account by a purchase amount.

To make a deposit and credit the purchasing account, an account holder establishes the account holder's identity. Establishment of the account holder's identity may include receiving account credentials from the account holder (e.g., at a kiosk or personal computer). Representative account credentials may include a user-id and/or passcode. Thereafter, a form of payment is selected as a means of depositing funds into an account.

Alternatively, biometric identifiers may be obtained at the kiosk or personal computer and used as account identifiers. For instance, a fingerprint, palm print, retinal scan, or photograph may be taken when an account is created, so as to obtain corresponding biometric identifiers. Such identifiers may be stored in the purchasing account and verified each time the account holder attempts to make a purchase from the account, or even to make a deposit into the purchasing account.

Payments may be made in response to a deposit request received from the account holder. Suitable methods for payment include electronic check (ACH) transfer, credit card payment, debit card payment, or a cash payment received by an attendant at a retail location or received at a cash acceptor kiosk. Where an electronic check is selected as the form of payment, an account holder may be required to guarantee payment of the deposit amount. A guarantee may be provided by any of a variety of suitable methods. For instance, the credit message may not be processed until the e-check clears, thus funds may be guaranteed by not being immediately available. Alternatively, the electronic check deposit may be guaranteed by a credit card or other pre-approved credit instrument which provides a fund (e.g., an interest bearing savings account) that can be drawn upon if the electronic check fails to clear. As an additional option, the account holder may establish a suitable credit rating with the account management system. For instance, a suitable credit rating may be established by completing an acceptable number of electronic check deposits. In yet another alternative, the account holder may guarantee the electronic check payment by submitting the electronic check for third party verification and authorization. In such an alternative, the account holder may also be required to consent to the fees charged by the third party for such verification and authorization, such that the deposit amount is reduced by a corresponding amount (or an approximation thereof). Except in the latter alternative (i.e., submitting an electronic check for third party verification and authorization), an account holder pays no costs or fees associated with the electronic transfer, because the associated costs and fees are either minimal or nonexistent.

Where a credit card or debit card is selected as the form of payment, an account holder may be required to consent to, and pay, any fees (or an approximation thereof) charged by the credit card or debit card issuer or authorization system. The deposit may then be reduced by the amount of such fees.

Where cash is selected as the form of payment, an account holder may be required to consent to, and pay, any fees (or an approximation thereof) associated with the transfer of funds using cash accepted by a cashier or by a cash acceptor machine by consenting that the amount of the transfer be reduced by the cost thereof, or by a standard transaction fee.

Where a deposit is to be made, the kiosk or personal computer may also receive an indicator which represents an amount to be credited to the purchasing account. The indicator may be a value entered by the account holder, automatically calculated by a cash acceptor, or authorized by a credit card or debit card issuer. The kiosk may also verify the deposit amount by receiving an authorization for the deposit. The authorization may be a code or message from an attendant at a retail location, or from the management system, a cash acceptor, an issuer of a credit or debit card, or from a third party. Thereafter, a credit message is sent to an account management system (or to a local database) which indicates that the purchasing account is to be credited by the verified amount.

In some embodiments, when the account management system receives account credentials, the account management system obtains the account balance of the corresponding purchasing account and transmits the account balance to the kiosk. In some embodiments, the kiosk configures a petroleum product dispenser (e.g., a gasoline pump) to dispense a petroleum product based on the account balance for the purchasing account being sufficient. The kiosk receives an indication of an amount of the petroleum product that was dispensed at the petroleum product dispenser. The kiosk calculates the cost of the dispensed petroleum product. In other embodiments, the kiosk calculates the amount of a purchase made at a checkout kiosk or point of sale scanning system, or receives an indication of the amount of a purchase from the checkout kiosk or a point of sale scanning system which calculates a purchase amount.

The kiosk sends a debit message (e.g., across a network) to the account management system. The debit message indicates that the purchasing account is to be debited by the calculated cost of either the petroleum product dispenser or the checkout or scanning system. The management system receives the debit message from the kiosk. The debit message indicates to the management system that a specified amount in services, merchandise, or petroleum products was purchased against the balance of the purchasing account. The management system debits the purchasing account by the specified amount in response to receiving the debit message.

The account balance in a purchase account may be sufficient to pay for multiple purchases, such as, for example, multiple tanks of gasoline (as opposed to tank-at-a-time purchases) or multiple purchases of products or services (as opposed to single, smaller purchase transactions).

The management system compiles and organizes the information received, providing categorized listings of purchases that may include items purchased (e.g., gasoline); the purchase date and time; the place of purchase; the amount of a purchase; quantities in gallons, pounds, or other similar measurements; and types of purchases (e.g., "regular unleaded," "produce," or "hardware").

In some embodiments, the account management system allows the transfer of funds between purchase accounts. In some additional embodiments, the account management system also include remotely monitored and controlled, attendant-free checkout payment completion, fuel dispensing, pump/street sign price changing, electronic message board management, real-time sales monitoring, and data collection and bookkeeping summarization, each potentially reducing overhead associated with selling products and services.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 5B, 5C, and 5D depict various user-interface screens that can be presented at the kiosk in FIG. 5A;

FIG. 6B-6D depict exemplary user-interface screens that can be presented at the kiosk in FIG. 6A.

DETAILED DESCRIPTION OF THE PREFERRED EMBODIMENTS

Figure 1:
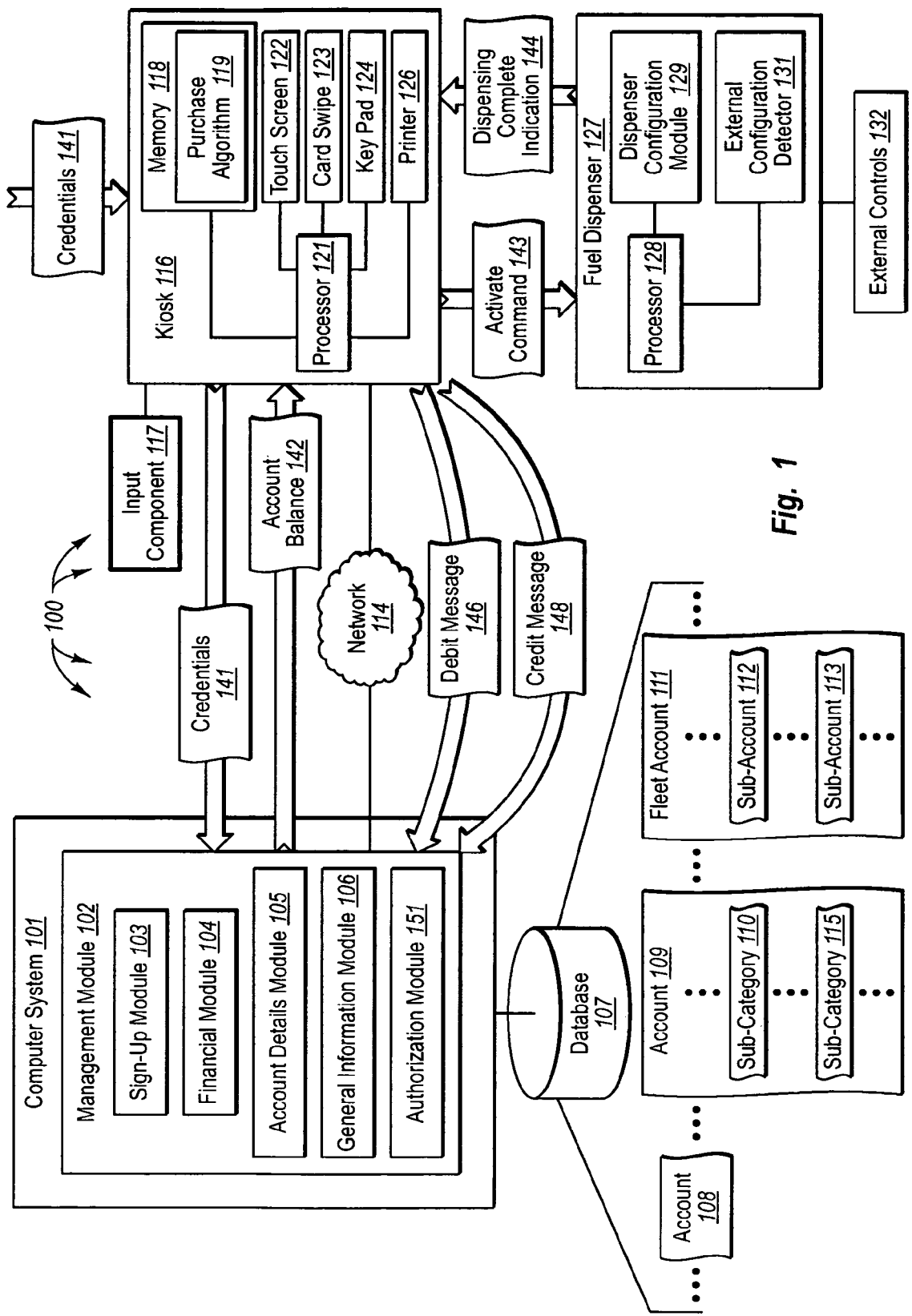
FIG. 1 illustrates an example computer architecture for managing purchasing accounts and managing the dispensing of petroleum products.

The principles of the present invention provide for managing payments for products and services. A kiosk or personal computer receives account credentials (e.g., through a user-interface) corresponding to a purchasing account. The kiosk submits the account credentials (e.g., across the Internet) to a management system.

The management system receives the account credentials from the kiosk. The account credentials indicate an account holder's attempt to make a purchase against the balance of a purchasing account, to make a deposit to add to the balance of the purchasing account, or to review account information and history. The management system identifies a corresponding purchasing account based on the received account credentials. The management system accesses purchasing account information for the corresponding purchasing account from an account database.

In one embodiment, the kiosk receives purchasing account information, including an account balance, from the management system. In the case of a petroleum purchase, the kiosk configures a petroleum product dispenser (e.g., a gasoline pump) to dispense a petroleum product based on the account balance for the purchasing account being sufficient. In the case of a purchase for other consumer products, the kiosk configures a point of sale scanning system to allow checkout of items based on the available account balance for the purchasing account being sufficient. The kiosk receives an indication of an amount of the petroleum product that was dispensed at the petroleum product dispenser or the prices of products scanned by a point of sale scanner or checkout kiosk. The kiosk calculates the cost of the dispensed petroleum product or the total cost of scanned products.

The kiosk sends a debit message (e.g., across the Internet) to the account management system. The debit message indicates that the purchasing account is to be debited by the calculated cost. The management system receives the debit message from the kiosk. The debit message indicates to the management system that a specified amount in petroleum or consumer products, or in services, was purchased against the balance of the purchasing account. The management system debits the purchasing account by the specified amount in response to receiving the debit message.

Embodiments of the product management system can also include networked (e.g., Internet) based payments into a purchasing account, either from a kiosk (either inside or outside a retail location) or from a personal computer. Consumers can pay for larger quantities of petroleum products, such as, for example, multiple tanks of gasoline, in a single payment, potentially reducing or even eliminating returned check losses and/or card network fess associated with "tank-at-a-time" purchases. Embodiments of the products management system can also include remotely monitored and controlled attendant-free fuel dispensing, pump/street sign price changing, an electronic message board management, real-time sales monitoring, and data collection and bookkeeping summarization, each potentially reducing overhead associated with selling products and services.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a computer network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in computer network environments with many types of computer system configurations, including, personal computers, laptop computers, hand-held devices, multi-processor systems, network PCs, minicomputers, mainframe computers, kiosks, computerized fuel dispensers, PDAs, and the like. The invention may also be practiced in distributed system environments where local and remote computer systems, which are linked (either by hardwired data links, wireless data links, or by a combination of hardwired and wireless data links) through a computer network, both perform tasks. In a distributed system environment, program modules may be located in both local and remote memory storage devices.

FIG. 1 illustrates an exemplary computer architecture 100 for managing the sale of products and services, dispensing of petroleum products, and/or creating a purchase account. Generally, computer system 101 and kiosk 116 are communicatively coupled via network 114. Network 114 can be a Local Area Network ("LAN"), Wide Area Network ("WAN"), or even the Internet. Computer systems connected to network 114 can receive data from and send data to other computer systems connected to network 114. Accordingly, computer system 101 and kiosk 116, as well as other connected computer systems (not shown), can create electronic messages and exchange electronic messages (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 114. In some embodiments, computer system 101 and kiosk 116 include Web services that create Simple Object Access Protocol ("SOAP") envelopes, for example, including eXtensible Markup Language ("XML") instructions, and exchange SOAP envelopes over network 114.

Computer system 101 includes management module 102 that can generally manage purchasing accounts accessible by a retail sales location. Management module 102 can also control the dispensing of fuel at a plurality of different retail sales locations, where each retail sales location has one or more kiosks and/or one or more fuel dispensers. Management module 102 includes sign-up module 103, financial module 104, account details module 105, general information module 106, and authorization module 151. Sign-up module 103 can be utilized to create a new purchasing account (e.g., account 108) for a consumer that will purchase fuel at one or more of the retail sales locations. Sign-up module 103 can include a local interface such that an administrator of computer system 101 can enter new account information for a consumer. Alternatively, sign-up module 103 can include a remote (e.g., Web-based) interface such that a consumer with connectively to network 114 can enter their own account information.

To create a new account, a consumer or administrator can enter account creation information, such as, for example, name, address, and telephone number. After an account is created, the account can be assigned an account number, a user-id, and a passcode (e.g., a password or Personal Identification Number ("PIN")). In some embodiments, a telephone number is used as the user-id. The user-id and passcode can be propagated to the consumer using virtually any communication mechanism, such as, for example, paper mail, electronic mail, or telephone. In other embodiments, a biometric identification of the user can be obtained and used as the user-id and/or the passcode.

Management module 102 can interoperate with database 107 to store newly created accounts in database 107. Database 107 can be configured to store individual consumer accounts, such as, for example, accounts 108 and 109. Generally, an individual consumer account can hold funds budgeted for future purchases for an individual consumer. A purchasing account may be a general or lump sum account which is usable to purchase any type of product or service available at a participating retail location. Alternatively, a purchasing account may include sub-categories corresponding to specific products or services. For instance, sub-category 110 in account 109 may be budgeted with funds usable for only specific product or service purchases (e.g. fuel, car wash, food). Database 107 can also be configured to store fleet accounts, such as, for example, fleet account 111. As depicted, fleet account 111 further includes sub-accounts 112 and 113.

Generally, a fleet account can hold funds in one or more sub-accounts that are budgeted for future fuel purchases by one or more corresponding vehicle operators or budgeted for one or more vehicles. A fleet account can include a master account that is controlled by a fleet account administrator and a sub-account for each driver or vehicle in the fleet. The administrator of the master account assigns a PIN and vehicle or driver number to each sub-account. Fuel purchases made using the sub-account are recorded both in the account history of that sub-account and in the history of the master account. Thus, there may be a number of user-ids and passwords associated with a fleet account. In addition, each sub-account may also have one or more sub-categories similar to sub-categories 110 and 115. For instance, a sub-category in a sub-account may create restrictors that limit the user's purchases to specific retailers or even to specific fuel types (e.g., octane levels).

A horizontal sequence of three periods (an ellipsis), before, between, and after accounts 108 and 109 and fleet account 111 represents that other accounts can be included in database 107. A vertical sequence of three periods (a vertical ellipsis) before, between, and after sub-categories 110 and 115 represents that other sub-categories can be included in account 109, while a vertical ellipsis before, between, and after sub-accounts 112 and 113 represents that other sub-accounts can be included in fleet account 111.

Financial module 104 can be configured to receive locally and/or remotely entered payments into an account (e.g., transmitted in credit message 148) and to receive locally and/or remotely entered debits to an account (e.g., transmitted in debit message 146). Financial module 104 can interoperate with database 107 to credit and debit the balances of accounts, sub-categories, fleet accounts, and sub-accounts stored in database 107, such as, for example, accounts 108 and 109, sub-categories 110 and 115, fleet account 111, and sub-accounts 112 and 113. Financial module 104 can also be configured to access card and/or check authorization networks for the verification of received account payments. Financial module 104 can also be configured to receive debit messages from kiosks and debit corresponding accounts, or to receive credit messages from kiosks and credit corresponding accounts. Financial module 104 can monitor transactions in essentially real time.

Account details module 105 can be configured to retrieve account information, such as, for example, name, address, telephone number, account balance, list of recent purchases, etc., from database 107. Account details module 105 can send retrieved account information (e.g., in an electronic message) to other computer systems, such as, for example, kiosk 116, other kiosks at the same retail location as kiosk 116, kiosks at other retail locations, or to other personal computers connected to network 114 (e.g., a consumer's business or residence computer system).

General information module 106 can be configured to provide general information related to the management system, such as, for example, contact information for a management system administrator and a listing of retail locations that support the management system. General information module 106 can also be configured to send and/or activate marketing and advertising at a kiosk during fueling.

Authorization module 155 can be configured to receive account holder credentials for a purchasing account, such as, for example, a user-id and password, attempt to authenticate the credentials, and authorize access to the purchasing account when appropriate. In response to authorization, financial module 104 can access financial information for a purchasing account and/or account details module can access other account information. Accessed financial and/or other account information can sent to a requesting computer system, such as, for example, a kiosk or other computer connected to network 114. If a kiosk (e.g., kiosk 116) is requesting access to debit an account (e.g., to allow a purchase), financial module 104 can check the balance of a purchasing account to determine whether or not the purchasing account has a sufficient account balance to make a purchase. If the balance is sufficient, computer system 101 can send the account balance and/or an indication that the consumer is authorized to make the purchase to the requesting kiosk.

In one embodiment, kiosks are positioned near, attached to, or mounted in fuel dispensers or payment registers. For example, kiosk 116 can be physically positioned near to fuel dispenser 127. Kiosk 116 includes processor 121, memory 118, touch screen 122, card swipe 123, key pad 124, and printer 126. Generally, kiosk 116 receives account holder credentials (e.g., at touch screen 122, key pad 124, or input component 117, for example, an external keyboard) and submits the credentials to computer system 101. Kiosk 116 can also be configured to activate one or more fuel dispensers, such as, for example, fuel dispenser 127. For example, in response to receiving an indication that a purchasing account has a sufficient balance to purchase fuel, kiosk 116 can activate fuel dispenser 127.

Kiosk 116 can also be configured with a card swipe 123 for reading credit and/or debit cards and network connection capabilities for inquiring with card authorization networks for card approval. Thus, consumers that do not have and do not want to create a purchasing account can still dispense fuel, or the card authorization network can be accessed to add funds to a purchasing account.

Printer 126 can be used to print purchasing account information and receipts for purchases.

Fuel dispenser 127 includes processor 128, dispenser configuration module 129, and external configuration detector 131. External configuration detector 131 can detect the external configuration of fuel dispenser 127, such as, for example, detecting whether or not a fuel dispensing nozzle is currently secured to fuel dispenser 127 and detecting the selection of a specified grade of fuel. Processor 128 can receive commands from kiosk 116 and from external configuration detector 131, can process received commands, and can instruct dispenser configuration module 129 to change the internal configuration of fuel dispenser 127 (e.g., to pump fuel from an appropriate underground tank).

For example, in response to an activating command from kiosk 116, detecting a fuel grade selection, and detecting that a fuel nozzle has been removed from fuel dispenser 127, dispenser configuration module 129 can internally configure fuel dispenser 127 to dispense the selected grade of fuel. When fueling is complete, for example, when external configuration detector 131 detects that the fuel nozzle has been secured at fuel dispenser 127, fuel dispenser 127 can indicate the amount of fuel that was dispensed to kiosk 116.

Figure 5A:
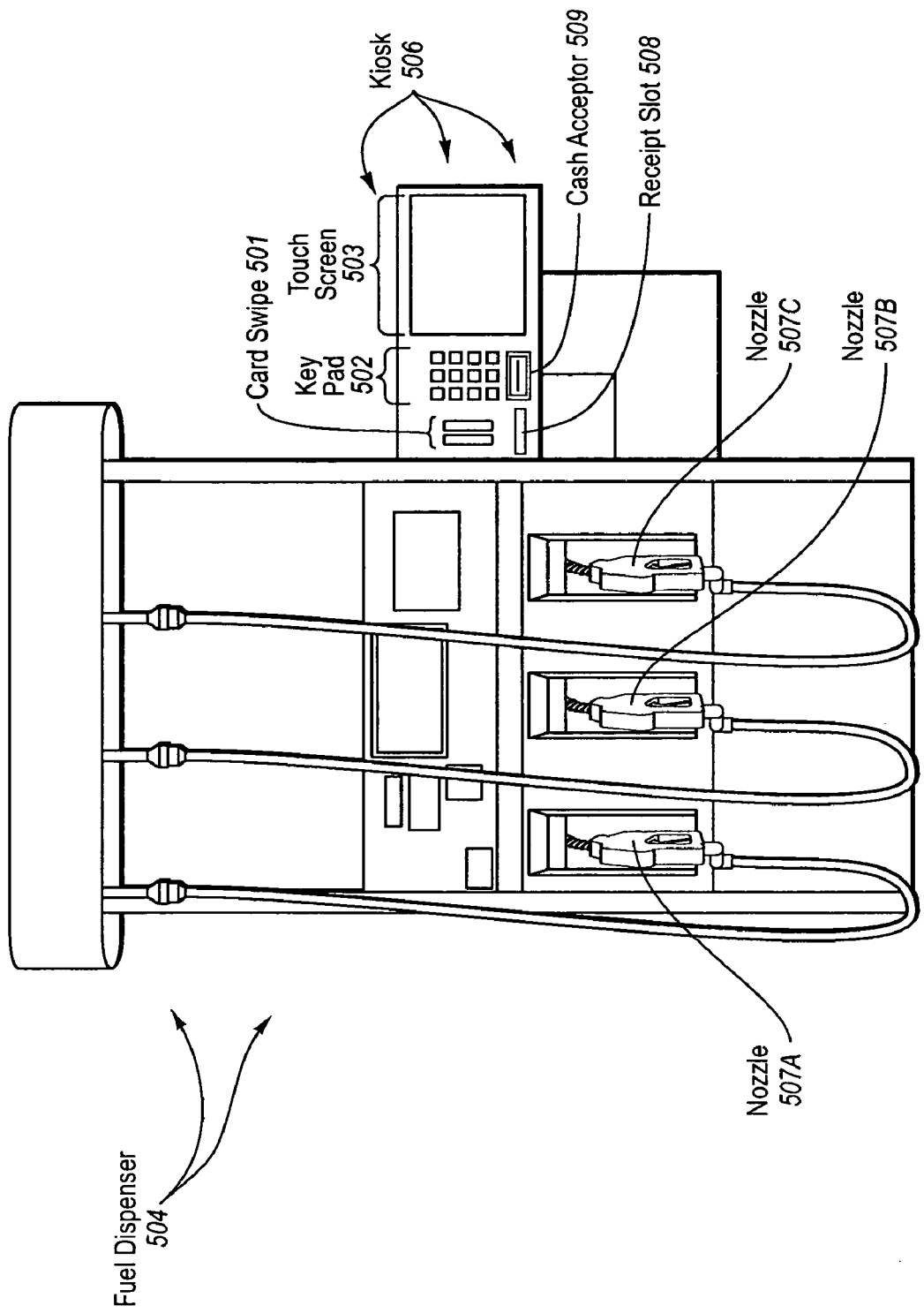
FIG. 5A depicts a fuel dispenser and corresponding kiosk, according to one embodiment of the present invention.

FIG. 5A depicts a fuel dispenser 504 and corresponding kiosk 506. As depicted in FIG. 5A, kiosk 506 includes card swipe 501 for swiping credit and debit cards, key pad 502 for entering a user-id and PIN, and touch screen 503 for presenting a user-interface and receiving user selections, an internal printer (e.g., printer 126) for printing receipts, and receipt slot 508 for providing printed receipts to a consumer. Fuel dispenser 504 can also be equipped with an interface 509 for receiving paper currency.

Figure 5B:
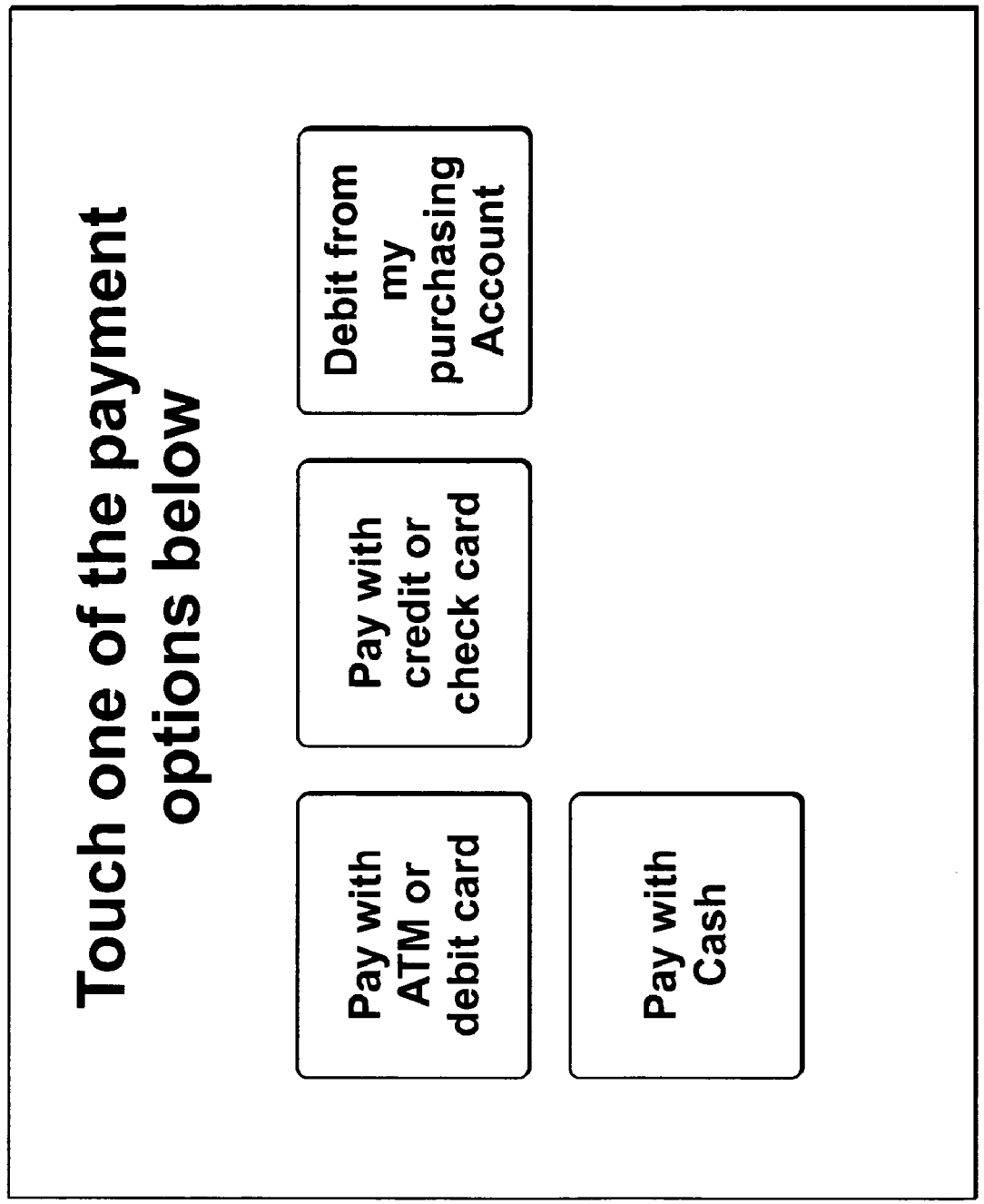

FIGS. 5B, 5C, and 5D depict some of the user-interface screens that can be presented at the kiosk 506 of FIG. 5A. FIG. 5B depicts a payment type selection screen that gives a consumer the option to select a form of payment from among ATM or debit card, credit or check card, debit from a purchasing account, or pay with cash. FIG. 5C depicts a fuel grade selection screen that gives a consumer the option to select a grade of fuel. The fuel grade selection screen can be displayed after a form of payment has been selected. After selecting a fuel grade, a consumer can remove the appropriate nozzle from among nozzles, 507A, 507B and 507C to dispense fuel.

FIG. 5D depicts an account history screen, for example, as presented by a management system web site. FIG. 5D also depicts other information than that is potentially presented by the management system web site. For example, an authenticated account holder can also view and edit their account information. An account holder or prospective account holder can access an introduction, obtain information on how the management system operates, list retail locations that support the management system, view information about the company that runs the management system, contact the company that runs the management system, and receive online help. Prospective account holders can also sign-up for a purchasing account.

In addition, an authenticated account holder can view categorized listings of purchases. For instance, as illustrated in FIG. 5D, the account history may indicate the date and time on which a purchase is made, as well as the location of the purchase. In addition, details about the purchase may be included. For instance, a purchase may indicate one or more product or service categories for the items purchased and optionally include a further description of specific items.

Further, a cost or pricing break down may be provided. For instance, a quantity (e.g. in pounds, gallons, units, etc.) may be listed along with a cost per quantity, and the total cost per item. Accordingly, it will be appreciated in light of the disclosure herein, that the account history can effectively function as a collective receipt system allowing a consumer to review all purchases made from the purchasing account on a line-item basis. Further, where a retail location (e.g., retail location 221) is network connected to a management system (e.g., management system 211), which maintains the account information, specific purchase information may be transmitted from retail location 221 in a separate purchase message (not shown) or the purchase message may be included in a debit message (e.g., debit message 146).

Figure 3:
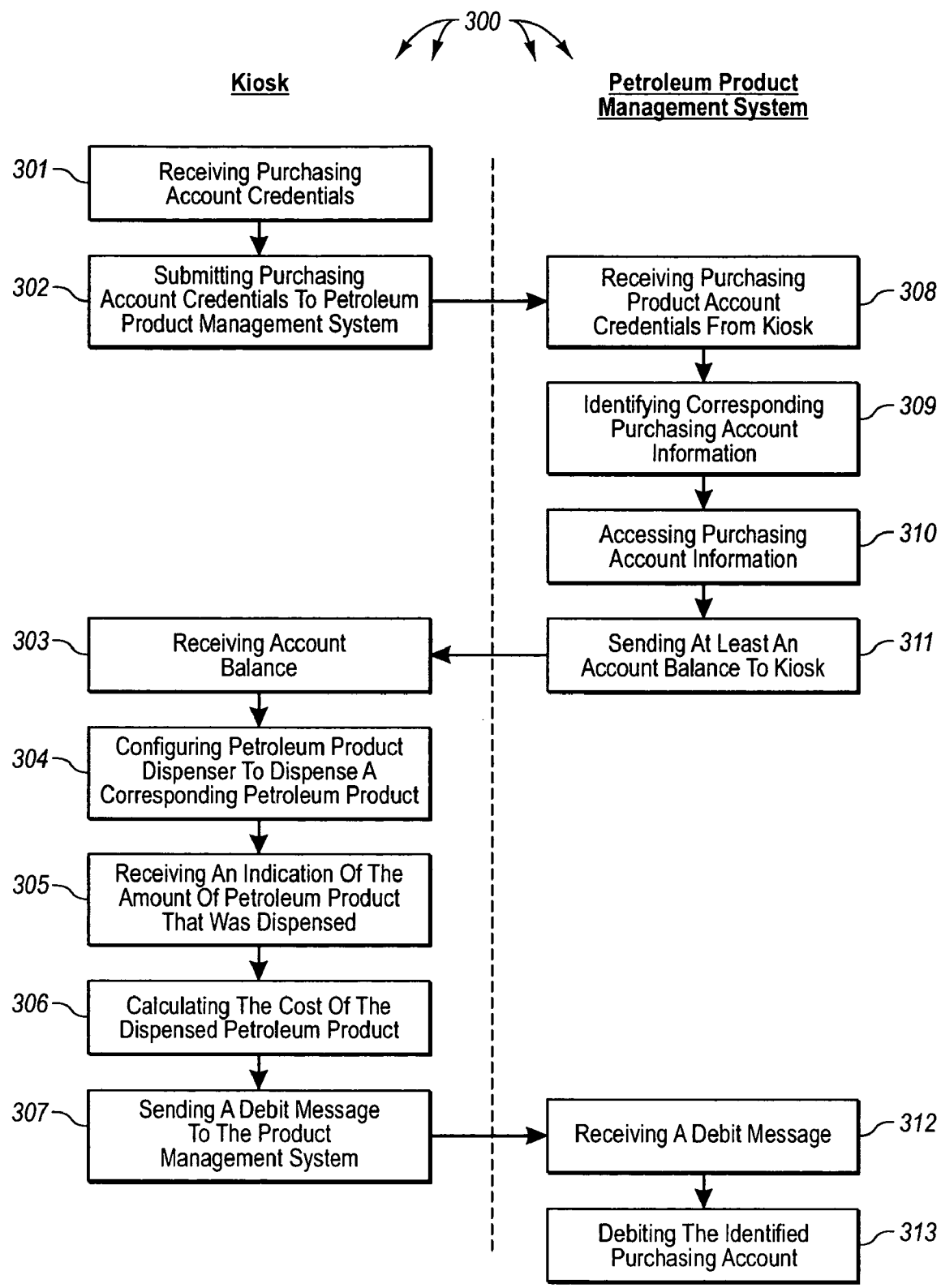
FIG. 3 illustrates an example flowchart of a method for dispensing petroleum products.

FIG. 3 illustrates an example flowchart of a method 300 for dispensing petroleum products. The method 300 will be described with respect to the components and data in computer architecture 100 of FIG. 1. While the illustrated embodiment is described in terms of dispensing petroleum products, it will be appreciated in light of the disclosure herein, that the description is equally applicable to dispensing or checkout of other products.

Method 300 includes an act of receiving purchasing account credentials (act 301). For example, kiosk 116 can receive credentials 141 at any of input component 112, keypad 124, or touch screen 122. In some embodiments, credentials 141 includes a telephone number and PIN corresponding to a purchasing account, such as, for example, an account stored in database 107. Such an account may be a general account for all types or purposes, or a purchasing account with a sub-category having a budget corresponding to fuel purchases.

It may be that kiosk 116 initially displays a screen similar to that of FIG. 5B. A consumer can select the desired payment method by touching the corresponding payment method icon on touch screen 122. If a consumer selects "debit from purchasing account", the consumer can then be prompted to enter a telephone number (or other user-id) and PIN, or provide biometric identification identified with the purchasing account. In response to the prompts, and depending on the configuration of kiosk 116, the consumer can enter a telephone number and PIN at keypad 124, at a virtual keypad displayed at touch screen 122, or at input component 117. A biometric identification such as a fingerprint or palm-print may also be obtained at touch screen 122 or input component 117, and input component 117 may also obtain a biometric identification from a retinal scan or through some other method.

Method 300 includes an act of submitting the purchasing account credentials to a petroleum management system (act 302). For example, kiosk 116 can submit credentials 141 to management module 102. The method 300 includes an act of receiving purchasing account credentials (act 308). For example, fuel management module 102 can receive credentials 141 from kiosk 116.

Method 300 includes an act of a identifying a corresponding purchasing account (act 309). For example, based on credentials 141, authorization module 151 can identify an account (e.g., account 108 or 109) or fleet account (e.g., fleet account 111), including a corresponding sub-account (e.g., sub-account 111 or 112) stored in database 107. Thus, when the appropriate account is identified, authorization module 151 can also identify the appropriate sub-account or the appropriate sub-category (e.g., sub-category 110 or 115) within an account (e.g., account 109).

Method 300 includes an act of accessing purchasing account information (act 310). For example, account details module 110 and/or financial module 104 can access account information (account history, account balance, etc.) for an account (including a sub-category) or fleet account (and sub-account) stored in database 107 identified by credentials 141. Method 300 includes an act of sending at least an account balance to the kiosk (act 311). For example, management module 102 can send account balance 142 to kiosk 116. Account balance 142 can be the account balance of the account, sub-category and/or sub-account identified by credentials 141.

Method 300 includes an act of receiving an account balance (act 303). For example, kiosk 116 can receive account balance 142 from fuel management module 102. Method 300 includes an act of configuring a petroleum product dispenser to dispense a corresponding petroleum product (act 304). For example, in response to receiving account balance 142, kiosk 116 can present a grade selection screen similar to that of FIG. 5C. A consumer can select the desired grade of fuel by touching the grade icon on touch screen 503. In response to fuel grade selection, kiosk 116 can execute purchase algorithm 119. In one embodiment, purchase algorithm 119 is adapted for use with a fuel dispenser such as fuel dispenser 127. Accordingly, an exemplary purchase algorithm 119 is a fuel dispenser algorithm. In this manner, purchase algorithm 119 can cause activate command 143 to be sent to fuel dispenser 127. Activate command 143 can indicate the selected grade of fuel to fuel dispenser 127.

In response to activate command 143, dispenser configuration module 129 can internally configure fuel dispenser 127 to dispense fuel and external configuration detector 131 can detect the configuration of external controls 132. If the appropriate nozzle has been removed, fuel dispenser 127 allows fuel to be dispensed. The consumer can then dispense fuel into their vehicle. Upon completion of dispensing fuel, fuel dispenser 127 sends dispensing complete indication 144 to kiosk 116.

As noted previously, the current method is not limited to fuel dispensing systems and can be used for the purchase and checkout of any type of product. For example, purchase algorithm 119 may be a checkout algorithm rather than, or in addition to, a fuel dispenser algorithm. A checkout algorithm facilitates checkout by an integral or separate kiosk in an amount equal to or less than the previously supplied account balance of a purchasing account.

For instance, as items are scanned or entered for checkout, the algorithm determines the total amount of the products, including any applicable sales tax or other fees or costs, and compares the balance against the previously supplied account balance. In some embodiments, payment entitles a consumer to a product discount (because of the reduced handling and other costs and fees), and the checkout algorithm calculates and applies the product discount. When an item is entered or scanned which causes the total products to exceed the available balance, checkout of the item is rejected and the user notified an additional deposit must be made into the account to make any additional purchases or a separate payment must be entered.

Now with continued reference to FIG. 3, method 300 includes an act of receiving an indication of the amount of petroleum product that was dispensed (act 305). For example, kiosk 116 can receive dispensing complete indication 144 that includes the dispensed amount. Method 300 includes an act of calculating the cost of the dispensed petroleum product (act 306). For example, kiosk 116 can calculate the cost of fuel dispensed at fuel dispenser 127.

Method 300 includes an act of sending a debit message to the petroleum product management system (act 307). For example, kiosk 116 can send debit message 146 to management module 102. Debit message 146 can include the calculated cost of fuel dispensed at fuel dispenser 127.

Method 300 includes an act of receiving a debit message (act 312). For example, management module 102 can receive debit message 146 from kiosk 116. Method 300 includes an act of debiting the identified purchasing account (act 313). For example, financial module 104 can debit the account (e.g., account 108) or fleet account (e.g., sub-account 112) identified by credentials 141 by the cost of dispensed fuel calculated at kiosk 116.

Thus, the computer architecture 100 facilitates pay-at-the-pump convenience without incurring card network fees or risk of returned check losses on a per transaction basis. Accordingly, retail locations that utilize compatible kiosks can potentially spread the cost of card network fees and risk of returned check losses across multiple transactions per account holder. As a result, these costs and risks have a reduced impact per transaction and any increase in fuel price due to these costs and risks is significantly reduced. Further, petroleum products can be dispensed attendant-free, further reducing retailer overhead. Thus, retailers are able to offer more competitive selling prices and yet also have higher sales margins.

Figure 2:
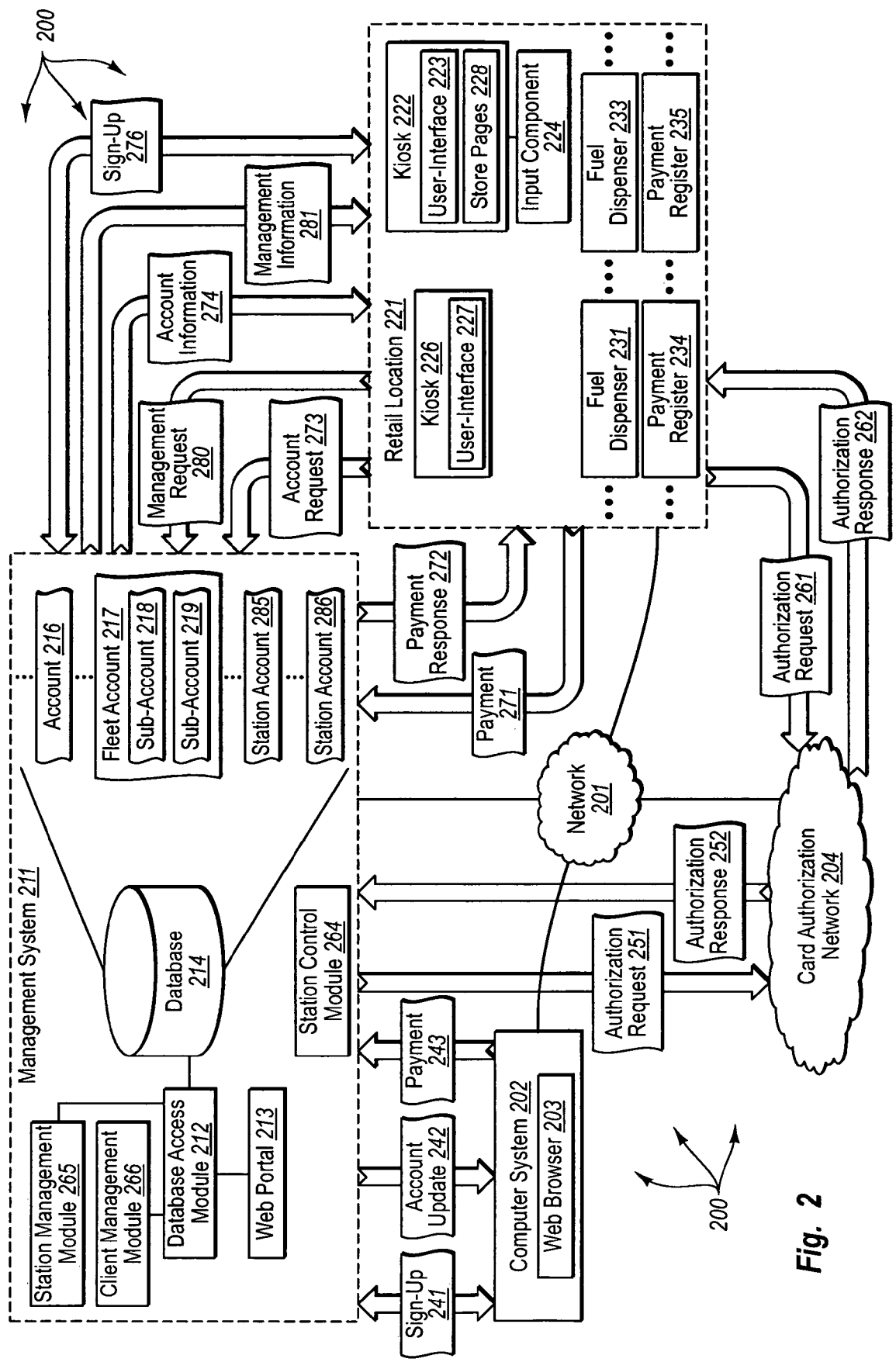
FIG. 2 illustrates a second example computer architecture for managing purchasing accounts and the dispensing of petroleum products.

FIG. 2 illustrates a second example computer architecture 200 for managing purchasing accounts and the dispensing of petroleum. Computer architecture 200 depicts management system 211, computer system 202, retail location 221, and card authorization network 204 communicatively coupled via network 201. Network 201 can be a Wide Area Network ("WAN") or even the Internet. Computer systems connected to network 201 can receive data from and send data to other computer systems connected to network 201. Accordingly, management system 211, computer system 202, kiosks 222 and 226, and computer systems included in card authorization network 204, as well as other connected computer systems (not shown), can create electronic messages and exchange electronic messages over network 201. These electronic messages can be formatted in accordance with various communication protocols as described above.

Computer system 202 includes Web browser 203 that is configured to browse Web pages including Web based content, such as, for example, Hypertext Markup Language ("HTML") instructions, XML instructions, audio, video, images, etc. Computer system 202 can be general-purpose home or business personal or laptop computer that has access to the World Wide Web ("WWW").

Management system 211 can include any of modules previously described as being included in management module 102. In some embodiments, management module 102 interoperates with Web portal 213 (e.g., a Web server) to provide Web based access to the functionality of management system 211. Thus, a user of computer system 202 can direct web browser 203 (or user-interface 223 or 227) to a network address (e.g., a Uniform Resource Identifier ("URI") or Uniform Resource Locator ("URL")) associated with web portal 213 (e.g., a management system home page).

After accessing web portal 213, the user can select a sign-up link (e.g., sign-up 511 of FIG. 5D) and be taken to a sign-up page. The user can enter account information into the fields of the sign-up page to create a purchasing account. Web portal 213 can forward the entered account information to database access module 212, which in turn stores the account information in database 214. Creation of a purchasing account can include the exchange of a number of electronic messages collectively represented as sign-up 241. Through the sign-up page, a user can create an account (e.g., account 216) or a fleet account (e.g., fleet account 217). As previously described, an account can include account sub-categories or a fleet account can include one or more sub-accounts (e.g., sub-accounts 218 and 219).

In one embodiment, sign-up 241 includes a photographic identification of the account holder. For instance, where a consumer signs-up for a purchasing account at a personal computer, the consumer may upload a digital photograph. Alternatively, for sign-up at a retail location, a kiosk or attached photo booth may include a camera for obtaining the photograph. The photograph may then be transmitted to management system 211, where it is stored with the purchasing account. Thereafter, when a user accesses the account information, the photograph may be displayed. Similarly, when a user attempts to make a deposit or purchase using the prepaid account, an attendant at a retail location could access the photograph over network 211 to verify the consumer's identity.

After a purchasing account is created, the user can submit a payment (or credit) to the purchasing account such that the purchasing account can subsequently be used to purchase fuel. Payments can be submitted in the form of currency, a paper check or electronically, such as, for, example, electronic funds transfer (automatic clearing house ("ACH") online check, pay pal, etc.), credit card, debit card, etc. as indicated by payment 243.

In some embodiments, electronic funds transfers into an account can be secured using credit cards. For example, a purchasing account holder can submit a credit card number to management system 211. Management system 211 can retain the credit card number and use the credit card number to secure other forms of payment, such as, for example, checks and electronic checks. Thus, when other forms of payments are submitted, the funds from those payments can immediately be made available for a purchase (e.g., before a submitted check clears). Alternatively, a check may be held until collected (e.g., by having a three-business-day waiting period).

Currency or paper checks can be processed by an attendant at retail location 221, an administrator of management system 211, or even at a kiosk (e.g. kiosk 222 or 226) and appropriately credited to the purchasing account.

When the form of payment is a credit or debit card, management system 211 can verify the payment with card authorization network 204. For example, management system 211 can send authorization request 251 (e.g., including a card number and purchase amount) to card authorization network 204. Card authorization network 204 can receive and process authorization request 251. Processing authorization request 251 can include determining if the card has an available credit or sufficient funds of at least the purchase amount. After making the determination, card authorization network 204 can return authorization response 252, indicating whether or not the payment is approved, to management system 211. When the payment is approved, management system 211 can further communicate with card authorization network 204 to debit the card and credit the corresponding purchasing account.

It may be that payment 243 is of an amount sufficient to pay for multiple purchases made over various visits to one or more participating retail locations (e.g., an amount larger that needed to for an in-store or "tank-at-a-time purchase. Thus, the prepaid purchasing account may have reduced costs to the merchant because costs and fees resulting from the deposit method can potentially be eliminated or fixed, may be charged directly to the consumer, or fees fixed on a per-transaction basis may be distributed over multiple purchases and transactions.

In response to receiving a payment (or some other change to a purchasing account), management system 211 can update the appropriate account information in database 214. Management system 211 can indicate account changes to computer system 202, such as, for example, as update account message 242. Computer system 202 can receive update account message 242 and display the contact of update account message 242 at Web browser 203.

A purchasing account holder with appropriate credentials can also initiate transfer funds between managed accounts, sub-accounts, or sub-categories. For example, the account holder of account 216 (e.g., a parent) can transfer available funds to some other account in database 214 (e.g., into a child's account). Providing a single payment used to credit multiple accounts further reduces the fees associated with making purchases. For example, submitting a single credit card payment reduces total amount of associated card fees.

As depicted, retail location 221 includes kiosk 222 and kiosk 226. Kiosks 222 and 226 can include components similar to kiosk 116 and may both be capable of activating fuel dispensers at retail location 221. Kiosk 226 can, in one embodiment, be in close physical proximity to fuel dispensers 231 and 223 such that a purchasing account holder can activate a fuel dispenser through kiosk 226 and then utilize the activated fuel dispenser to dispense fuel more efficiently, or may be included inside the fuel pump (including account deposit and sign-up kiosks). Fuel dispensers 231 and 233 can be configured similarly to fuel dispenser 127. Kiosk 222 can be located further away from fuel dispensers 231 and 233, such as, for example, inside a building at retail location 221. Kiosk 222 may, for example, be located in close proximity one or more of payment registers 234 and 235.

In some embodiments, consumers are also able to sign-up for a purchasing account at a retail location and/or review and update consumer's purchasing account(s) at a kiosk or retail location. For example, a consumer can use kiosk 222 to access the management system home page. After accessing the home page, the consumer can select a sign-up link (e.g., 511) and be taken to a sign-up page. User-interface 223 (e.g., a general-purpose or specialized Web browser) can present fields for receiving account information.

The consumer can enter the appropriate account information into the presented fields and send the account information to management system 211. Creation of a management account from retail location 221 (e.g. at kiosk 222) can include the exchange of a number of electronic messages collectively represented as sign-up 276. Generally, entering account information at kiosk 222 is similar to entering account information at computer system 202. It may be, for example that kiosk 222 is equipped with input component 224 (e.g., a keyboard) to make data entry more efficient.

Purchasing account holders can also access account information through a kiosk. For example, a purchasing account holder can log into the management system (e.g., using a user-id and PIN) at kiosk 226 or 222. Subsequently, the purchasing account holder can access an account information page that causes the submission of account request 273 to management system 211. In response to account request 273, management system 211 can retrieve account information for the appropriate purchasing account. Management system 211 can send the appropriate account information back to the requesting kiosk in account information 274. Account information 274 can include the amount of purchases made over a specified period of time, including the amount of fuel used, and provides a purchasing account holder with information to budget for future purchases. Similar account information can also be provided to a purchasing account holder a computer system 202.

Purchasing account holders can also submit deposits at a kiosk. Deposits submitted at a kiosk are processed similar to those submitted at other computer systems (e.g., computer system 202). For example, a purchasing account holder can submit a deposit from kiosk 222 to management system 211, which is transmitted in FIG. 2 as payment 271. Kiosk 222 can be configured to accept paper currency (e.g., cash), checks, electronic funds transfer, and credit and debit cards. Paper currency can be received at an appropriate interface at kiosk 222. Card and debit cards can be received at a card swipe, for example, card swipe 501. When a kiosk has Internet access or is connected to network 201, a consumer may also initiate an electronic funds transfer.

For instance, a purchasing account holder can submit cash or a check, in an amount sufficient for multiple purchases, to an attendant at retail location 221. The attendant can then utilize kiosk 222 (or some other, potentially employee only, kiosk) to submit payment 271.

Figure 6A:
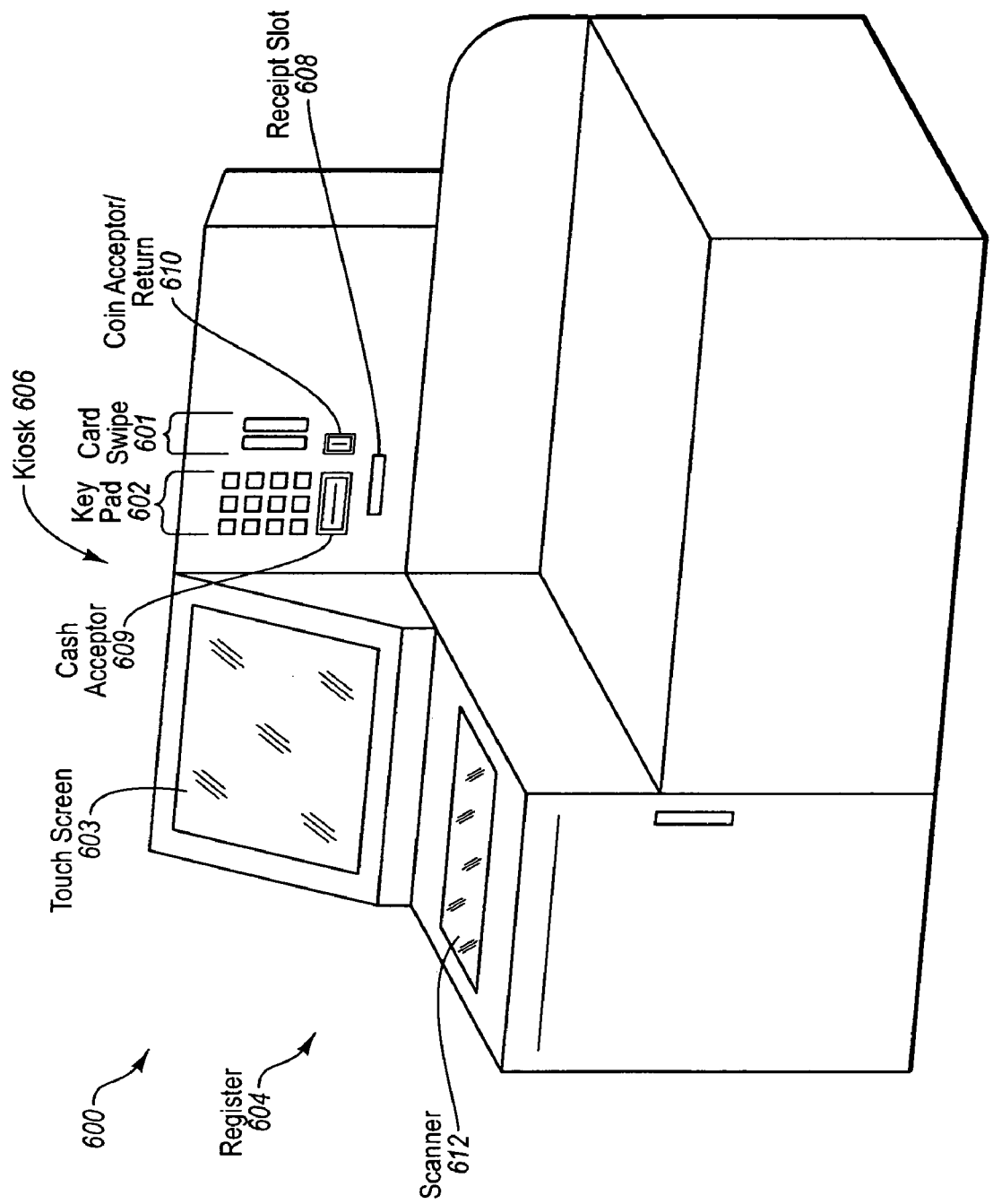
FIG. 6A depicts a checkout register and corresponding kiosk, according to one embodiment of the present invention.

Turning now to FIG. 6A, an exemplary embodiment of an attendant free kiosk assembly 600 is illustrated depicting a checkout register 604 and corresponding kiosk 606. As depicted in FIG. 6A, kiosk 606 includes a card swipe 601 for swiping credit and debit cards, key pad 602 for entering a user-id and PIN, a touch screen 603 for presenting a user-interface and receiving user selections, and optionally for receiving biometric information, a cash acceptor 609, a coin acceptor/return 610, and a receipt slot 608 for providing printed receipts to a consumer.

FIGS. 6B, 6C and 6D depict some of the user-interface screens that can be presented at kiosk 606, along with the user-interface screens illustrated in FIGS. 5B and 5D. FIG. 6B depicts a deposit method selection screen that gives a purchasing account holder the option to select a form of deposit payment from among ATM or debit card, credit or check card, electronic check, or cash. FIG. 6C depicts a user-interface screen for selecting a method to guarantee payment of an electronic check. FIG. 6D depicts a deposit amount selection screen that gives a purchasing account holder the ability to input a desired deposit amount. FIG. 6D also illustrates an optional verification code input for allowing a verification code to be entered by an attendant at the retail location.

Figure 7:
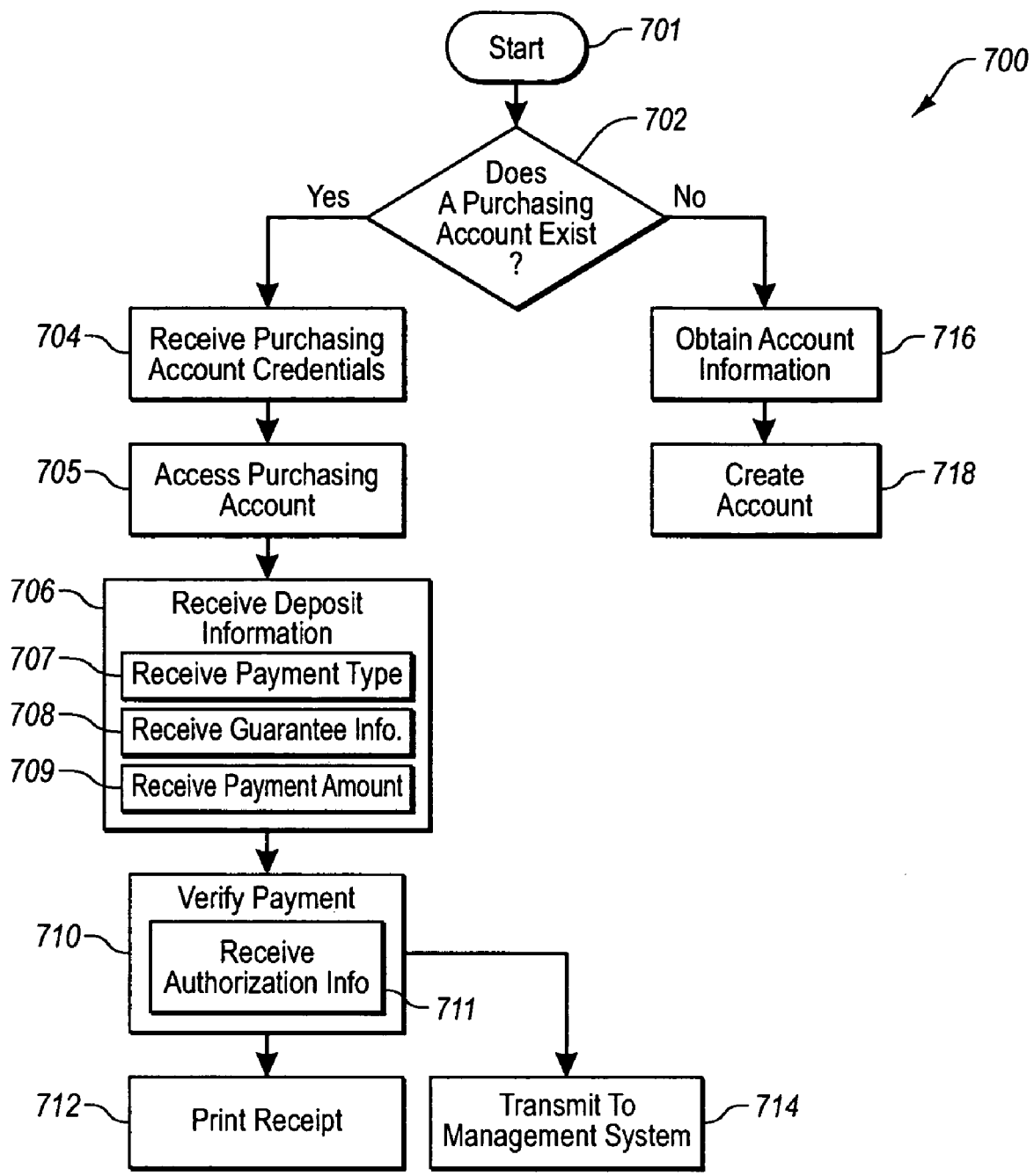
FIG. 7 illustrates an exemplary method for adding funds to a purchasing account through a kiosk.

FIG. 7 illustrates an exemplary flowchart of a method 700 for making a deposit to a purchasing account. The method 700 will be described with respect to the components and data in computer architecture 200 of FIG. 2, and the user-interface screens of FIGS. 5B, 5C, 6B, 6C and 6D. To simplify the description herein, the discussion will primarily be described while referring to kiosk 222 of FIG. 2, although it should be appreciated that an equal discussion is applicable for kiosk 226 and/or kiosk assembly 600 (FIG. 6A).

In addition, method 700 is described in terms of a single kiosk (e.g., kiosk 222) which includes a range of functional features, although it may be appreciated that multiple kiosks can be provided and some kiosks may have less than all of the features and aspects described herein. For instance, a single kiosk may incorporate only checkout features (e.g., assembly 600), or a single kiosk may be used for any or all of checkout, account sign-up, and cash acceptance functions.

In method 700, a purchasing account holder initially desires to add funds to a purchasing account (act 701). For example, a purchasing account holder may desire to make a cash, electronic check, credit or debit card, or other payment which will be credited to a preexisting, prepaid purchasing account (e.g., account 216) or to a new purchasing account. In some embodiments, the user enters retail location 221 to make such a payment at a kiosk (e.g., kiosk 222), while in other embodiments, a user makes the payment over a personal computer (e.g., computer system 202).

It may be that user-interface 223 of kiosk 222 initially displays a screen similar to that of FIG. 5B or 5D. Notably, screens or pages to be displayed by user-interface 223 may be provided by management system 211 and/or kiosk 222. For instance, as previously discussed, management system 211 can include web portal 213 which provides web-based functionality. Thus, as an account holder uses kiosk 222, a consumer can direct user-interface 223 to network addresses associated with web portal 213. Alternatively, or in addition thereto, pages may be stored locally on kiosk 222. For instance, as illustrated in FIG. 2, kiosk 222 includes store pages 228 which are displayable by user-interface 223.

To make a payment, a purchasing account must first have been established. Accordingly, as represented by decision box 702, it is determined whether a purchasing account currently exists for the consumer. If a purchasing account exists, the answer is in the affirmative, and kiosk 222 receives credentials of the purchasing account (act 705). Purchasing account credentials may be provided by the consumer and received by kiosk 222 in any of a variety of manners. For instance, the consumer may enter a user-id, password, PIN, or the like by using input component 224 (e.g., a key pad, touch screen, or keyboard). In another embodiment, account credentials are biometric. Accordingly, kiosk 222 may, through input component 224, receive biometric indicators of the purchasing account holder. For instance, input component 224 may be a fingerprint or palm print reader, or a retina scanner. In this manner, the biometric information obtained by kiosk 222 (e.g., fingerprint, palm print, or retinal scan), may be used as account credentials.

Optionally, kiosk 222 then accesses the consumer's purchasing account (e.g., account 216) stored at management system 211 or retail location 221 (act 705). For instance, kiosk 222 may submit the account credentials to management system 211 as account request 273. Management system may, in turn, receive the account credentials, identify a corresponding purchasing account, access purchasing account information, and return a response to kiosk 222 as account information 274 which indicates that the purchasing account has been identified. In some embodiments, account information 274 includes account information such as, for example, an account balance.

Method 700 also includes an act of receiving the amount of payment to be credited to a purchasing account (act 706). For example, kiosk 222 may receive, through input component 224, indication that a consumer desires to make a deposit. The user may indicate this desire by, for example, selecting a payment option such as "make deposit" 513 illustrated in FIG. 5D. The user may then select the type of payment to be used in making the deposit (act 707). For instance, in one embodiment, in response to a user indicating that a deposit is to be made, user interface 223 displays a screen such as that illustrated in FIG. 6B. As illustrated, a user may then select any of a variety of payment options. Representative deposit methods include, for example, payment by ATM or Debit card, credit or check card, paper check, electronic check (ACH transfer), or cash.

As noted, one method to make a deposit payment is by using an electronic check. A feature of electronic checks is that payments can be submitted by a merchant without some or all of the costs or fees normally associated with accepting paper checks. For instance, the in-store handling costs and losses can potentially be eliminated. Electronic checks may, however, still be subject to risks of loss and the costs due to insufficient funds and third party verification and guarantee fees. Accordingly, in one embodiment, kiosk 226 and/or management system 221 is adapted to reduce those risks and costs by requiring the holder of a purchasing account to guarantee the funds.

In FIG. 6C, for example, is an exemplary screen which may be displayed on user-interface 223 when a user selects the electronic check payment option. As illustrated, payment funds may be verified by any of a variety of manners. For instance, a user may not need the deposited funds immediately. Accordingly, the user may select to delay the availability of the deposit amount until the electronic check clears. In this manner, kiosk 222 and account management system 211 allow time for the electronic check to clear before a credit is posted to the consumer's purchasing account. If the electronic check does not clear, then the deposit amount is not credited to the account.

Alternatively, an account holder may choose to guarantee funds with a credit card or similar pre-approved credit instrument. Under this option, the user can enter a credit card number as a guarantee for credit of the deposit amount to the purchasing account and the funds can be made almost instantly available to the user. Thereafter, the electronic check is processed. If the payment does not clear, the deposit may be charged to the credit card. Optionally, the deposit amount is reduced by credit card processing or other fees incurred by the merchant when the credit card is processed after the electronic check fails to clear.

In some embodiments, the consumer may choose to guarantee the deposit amount by using an interest bearing savings account or some other fund bearing account. If such a guarantee method is selected, the funds can be made almost instantly available to the user either in the total amount. Thereafter, the electronic check is processed. If the payment does not clear, the deposit amount may be withdrawn from the savings or other account and transferred to retail location 221 or management system 211.

In yet another embodiment, a consumer may choose to verify and guarantee funds through a third party. In this manner, the consumer can almost immediately have funds deposited into his or her purchasing account. This method may, however, subject the merchant to additional verification fees or costs. Accordingly, in one embodiment, the additional fees are charged to the consumer. For instance, the consumer may be notified that the option includes additional fees. After such a method is selected, kiosk 222 may notify the consumer of the amount of the fee (or an approximation thereof) and obtain consent for the fee to be incurred. Thereafter, when the verification is completed, the deposit amount is charged to the consumer by reducing the deposited amount.

Finally, an electronic check may be guaranteed by establishing a suitable transaction rating or history with the retail location or management system. For instance, after successfully completing an acceptable number of electronic check transactions (either consecutive or total), management system 211 may mark a purchasing account with a "good credit rating" or other indicator. This indicator effectively acts as a guarantee for electronic check payments in that funds become immediately available to the holder of the purchasing account. Such an indicator may be passed from management system 211 to kiosk 222 upon accessing the account (act 705). In this manner, the screen illustrated in FIG. 5C may be skipped or omitted as no additional guarantee may be necessary.

While an electronic check payment can thusly be submitted and processed with little or no cost or fees to the merchant, an electronic check may not be a desirable or possible payment method for some account holders. Accordingly, such account holders may make payments by any other suitable method, although such methods may impose costs or fees on the merchant. Alternatively, such payment methods can be processed and the costs passed directly to the consumers selecting alternative payment options. For instance, where a user submits a cash or paper check payment, handling fees (or an approximation thereof) can be charged to the consumer who consents to the fee reducing the deposit credited to a purchasing account. Similarly, deposits made by credit or debit card are subject to verification and processing fees. Upon selection of a credit or debit card payment, the consumer may be notified of the corresponding fee (or an approximation thereof), and consent to a reduction of the deposit by the corresponding amount.

Although an electronic check may be used as one acceptable payment method, a variety of other payment methods may be used by a consumer who desires to deposit funds into a purchasing account. For instance, and as described above, payments may be made by submitting cash or paper check to an attendant at a retail location or, by insertion of cash into a cash acceptor, or by credit card or debit card. If such payments are desired, the consumer may optionally be charged a fee for processing the payment. For instance, while an electronic check can be processed with few or no additional fees or costs to the merchant, cash, paper checks, credit cards and debit cards may result in additional fees being charged to the consumer.

While receiving deposit information (act 706), kiosk 222 may also receive an indication of the amount to be deposited (act 709). This amount may be indicated either before or after selecting the type of payment (act 707). In one embodiment, user interface 223 displays a screen such as that illustrated in FIG. 6C. In such an embodiment, the consumer may enter a value of the deposit amount into a corresponding field or input region, and which is representative of the cash, electronic check, credit card, or debit card payment to be made. Alternatively, the amount may be entered automatically by kiosk 222. For instance, a cash acceptance interface of kiosk 222 may detect an amount of cash received and input a corresponding amount which may be viewed and verified by the consumer.

The method 700 for receiving a payment to be credited to a purchasing account further includes an act of verifying a payment (act 710). For a credit or debit card, for example, verifying the payment (act 710) may include receiving authorization information (act 711). For instance, when a consumer swipes the credit or debit card, the deposit amount can be sent in authorization request 261 to card authorization network 204. If the card and purchase amount are authorized, card authorization network 204 sends authorization information in authorization response 262 which is received by kiosk 221. Optionally, the authorization response or an authorization code is displayed to the consumer or printed on a transaction receipt.

Similarly, verification may also occur when a cash payment is made at retail location 221. For instance, as noted, kiosk 222 may include a cash acceptance interface which automatically verifies the amount received from the consumer. Alternatively, the consumer may make a cash payment directly to an attendant at retail location 221. In such a case, the act of the kiosk receiving authorization information (act 711) may include receiving authorization information from the attendant. An attendant may be assigned, for example, an authorization code which is required for verification of a payment (act 710). The authorization code may be specific to a retail location 221 or may be unique to the attendant, thus acting as an identification of the attendant. In this manner, when the attendant receives cash from the consumer desiring to deposit funds into a purchasing account, the attendant may confirm that the payment matches the identified payment amount. Thereafter, if the payment received by the attendant matches the identified payment amount, the attendant may enter the authorization code into user-interface 223 using input component 224 or another available means. Upon receipt of the authorization code, kiosk 222 is authorized to transmit a record of the payment as payment 271 to management system 211 (act 714) and print a receipt (act 712) indicating the payment has been made. The receipt may include acknowledgement of the deposit amount, and may also include an updated account balance received from management system 211 as discussed herein.

Deposits received at retail location 221 may be sent to management system 211 in any of a variety of manners. For instance, as noted above, upon receipt of a payment, a record of the payment may be transmitted from retail location 221 to management system 211. This record of payment may be transmitted at or near the time the payment is received, or at a scheduled time of day such that information of various payments are batched together and transmitted as payment 271.

In addition, or in the alternative, retail location 221 may transmit funds to management system 211 either at the time payment is received or at a scheduled or later time such that various payments may be transmitted as a batch. For example, at the end of a business day, a batch ACH transfer may be initiated as payment 271 which transfers funds corresponding to the total amount of purchasing account payments received inside retail location 221. In some embodiments, records of deposits are transmitted from retail location 221 to management system 211 and at a specified time, such as the end of a business day, management system 211 initiates a batch transfer of the deposited funds.

As further illustrated in FIG. 7, a user may not yet have a prepaid purchasing account. Accordingly, if it is determined that a purchasing account does not exist for a consumer, decision box 702 is answered in the negative. A negative answer may be indicated by receipt of a response from a consumer, through input component 224, which indicates lack of an existing account. For instance, a user-interface 223 may display a window similar to that in FIG. 5D, and input component 224 may be used to select sign-up 511 which indicates the lack of an existing account.

Upon determining that a new account is needed, the consumer can be taken to a sign-up page and kiosk 222 may obtain information about the consumer creating the purchasing account (act 716). The consumer can enter account information into the fields of a sign-up page to create a purchasing account. Entered account information can include, for example, a first and last name, address, and telephone number. In addition, the account holder's biometric information may also be obtained and stored for use as a user-id and/or passcode. Thereafter, the purchasing account can be created (act 718). For instance, the information may be forwarded to web portal 213 of management system 211. Web portal 213 can forward the entered account information to database access module 212, which in turn stores the account information in database 214. Creation of a purchasing account can include the exchange of one or more electronic messages collectively represented as sign-up 276.

Account information and account credentials may also be automatically generated. For instance, upon creation of the purchasing account (act 718), an account can be automatically assigned an account number, a user-id, and a passcode (e.g., a password, or PIN). In some embodiments, a telephone number is used as the user-id. The user-id and passcode can then be propagated to the consumer using virtually any communication mechanism. As discussed above, in other embodiments, the user-id and/or passcode is a biometric identification obtained prior to, or during creation of the purchasing account (e.g. a fingerprint, palm-print, or retinal scan obtained at an input component 223).

After a purchasing account has been created, the consumer can make a payment to add funds to the newly created purchasing account. Accordingly, kiosk 222 may then receive deposit information (act 706), verify the deposit payment (act 710), transmit the payment to management system 211 (act 714), and print a receipt for the consumer (act 712).

Referring again to FIG. 2, upon receipt of a deposit, management system 211 can receive payment 271 and process payment 271 similar to the processing of payment 243. After processing, management system 211 can send payment response 272 back to kiosk 222. Payment response 272 can indicate if payment 271 was accepted and can include an updated account balance for the appropriate purchasing account. When submitting a payment by credit or debit card, purchasing account holders can swipe their card or can enter the card number using input component 224. When submitting an electronic check, input component 224 may include a check scanner and/or a user may enter the electronic check information so that it is displayed at user-interface 223.

As previously described, kiosks can be configured to accept card and debit cards as a form of payment. Referring briefly back to FIG. 5B, when a consumer selects "Pay With Credit Or Check Card", the consumer is then prompted to swipe their card. The kiosk then queries card authorization network 204 to verify the swiped card. For example, kiosk 226 can submit authorization request 261 to card authorization network 204. Card authorization network 204 can process authorization request 261 and return authorization response 262 to kiosk 226. Based on authorization response 262, kiosk 226 may or may not activate the appropriate dispenser or purchase register, or may or may not indicate that additional funds are approved for deposit into a purchasing account.

In some embodiments, management system 211 is also configured to monitor and control retail locations. For example, station control module 264 can remotely monitor and maintain contact with kiosks at a number of different retail locations. Through remote communication with kiosks station control module 264 can update kiosk software modules, reboot kiosks, change prices, monitor sales, and analyze software and hardware. Station control module 264 may also, for example, communicate with and monitor and control automatic, attendant-free checkout stations (e.g., assembly 600). Station control module 264 can also be configured to communicate with other networked devices, such as, for example, signs, at retail locations. For example, station control module 264 can communicate with signs to update fuel prices and/or displayed text remotely. In some embodiments, the desired prices and/or text is entered at management system 211 and then a single command is issued to implement price and/or text changes at all kiosks and signs at a retail location. In this manner, a variety of tasks normally undertaken by individual retail locations can be automated and remotely controlled, thus potentially reducing overhead associated with selling products and services.

In some additional embodiments, management system 211 is also configured to allow an administrator of a retail location (e.g., a gas station) to manage account and station information. For example, station management module 265 allows a manager of the retail location to manage and access location-specific information. For instance, a station manager can, through computer system 202 or kiosk 222 or 226, provide account credentials (e.g., a user-id, PIN, password) which are transmitted to management system. Upon receipt of the credentials, station management module 265 associates the station manager's account credentials with a station account (e.g., station account 285 or 286) which also indicates the station manager has an administrative role. Once recognized as a station manager, station management module 265 allows the station manager to track and manage attendant and employee verifications through computer system 202 or kiosk 222 or 226.

For instance, the station manager may request information on payments received at the retail location, which causes the submission of management request 280 to management system 211. In response to management request 280, management system 211 retrieves past information stored in the station account (e.g. station account 285) or monitor information as it is being provided. Management system 211 can send the stored or real time payment information back to the requesting location in management information 281. In this manner, as cash and check payments are accepted at retail location 221, station management module 265 monitors the payments verified by kiosks and attendants and provides the information to the station manager.

In addition, station management module 265 allows a station administrator to track and manage attendant identifications. To verify cash or check payments received at retail location 221, and as described herein, an attendant may accept the payment and enter an authorization code to confirm the deposit amount, and to allow the accepting kiosk to verify the credit to a purchasing account. The authorization code may be specific to the attendant, such that through station management module 265, the station manager can create, modify, remove, or otherwise manage attendant identifications and track payments confirmed by station attendants.

Further, station management module 265 allows a station manager to track deposits and deposit histories with management system 211, and otherwise manage banking and other store information.

In some embodiments, management system 211 is also adapted to allow an administrator of the management system to manage purchaser and station accounts. For instance, an administrator may supply credentials to management system 211 which a client management module 266 associates with a system administration role. The administrator can monitor credits and debits to purchasing accounts, as well as monitor station accounts and transfer from retail locations.

Accordingly, embodiments of the present invention provide consumers with a computer generated account wherein funds can be placed using various forms of payment, such as, for example, cash, checks, electronic funds transfers, electronic check, credit/debit cards, for the use of making purchases. Further, the computer generated accounts can maintain a computer generated record of available funds and past purchases. Thus, funds can be received and credited to an account before authorization to make the purchase is made. In this manner, a purchasing account can act as a prepaid account.

In some embodiments, for example, when payments are submitted through electronic funds transfers and/or electronic checks, overhead (e.g., potential for returned check loses) associated with the transaction is virtually eliminated. In any event, any associated overhead (card fees, charge backs, attend costs, etc) can be spread across multiple purchases thereby reducing the portion of the overhead associated with a single purchase. For example, a consumer can present a human attendant with a cash payment sufficient to purchase multiple tanks of fuel thereby spreading the overhead associated with the human attendant (cash handling costs, security, attendant mistakes, etc.) across the multiple purchases.

Further, through the use of fleet accounts, a fleet account administrator can control the purchase of fuel through fund allocations to various sub-accounts. Similarly, a purchasing account holder that manages multiple accounts can transfer funds between the accounts.

Figure 4:
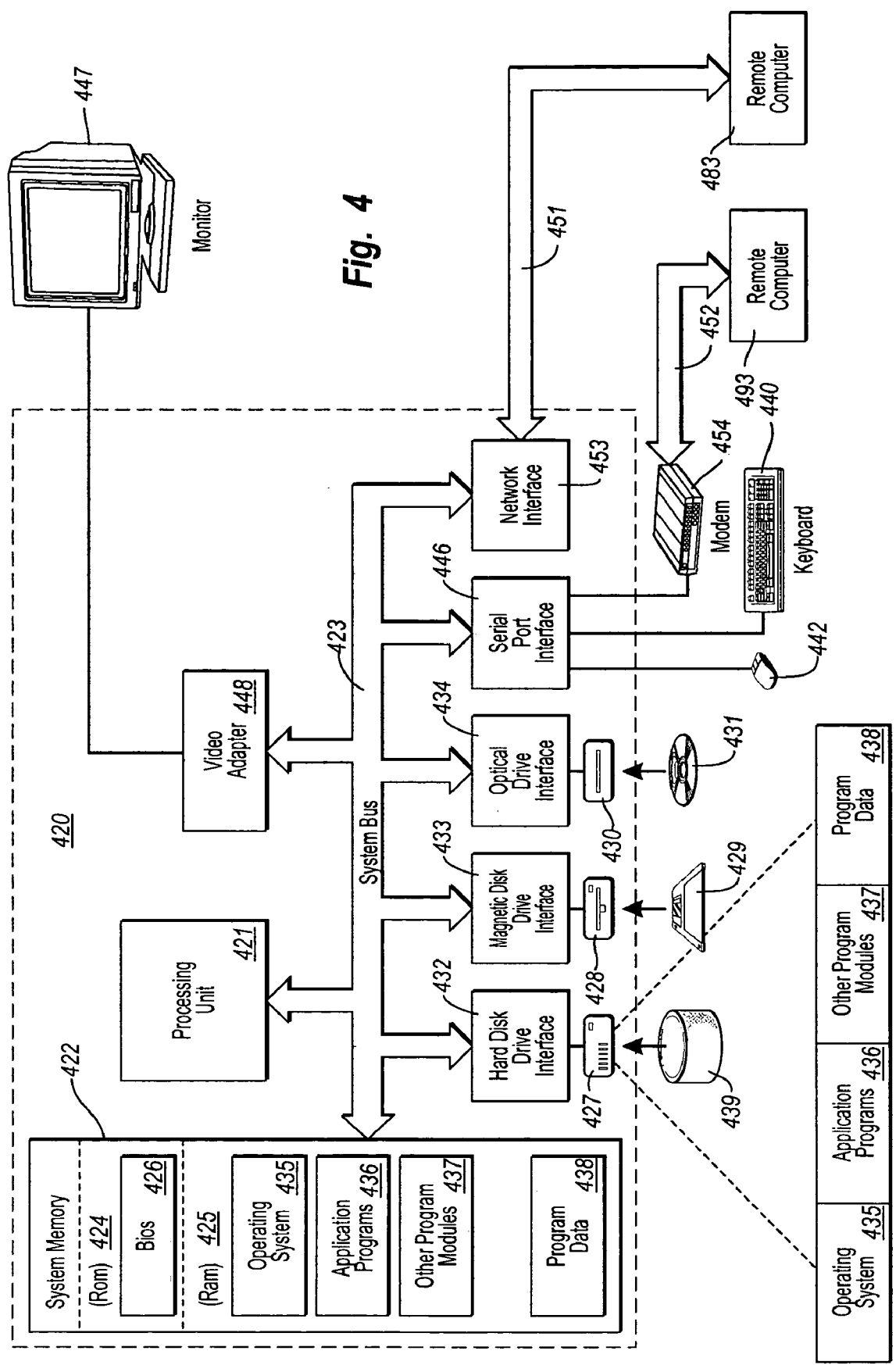
FIG. 4 illustrates a suitable operating environment for the principles of the present invention.

FIG. 4 and the following discussion are intended to provide a brief, general description of a suitable computing environment in which the invention may be implemented. Although not required, the invention can be implemented in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Speakers or other audio output device is also connected to system bus 423 via an audio interface. Other peripheral output devices (not shown), such as, for example, printers, can also be connected to computer system 420.

Computer system 420 is connectable to computer networks, such as, for example, an office-wide or enterprise-wide computer network, a home network, an intranet, and/or the Internet. Computer system 420 can exchange data with external sources, such as, for example, remote computer systems, remote applications, and/or remote databases over such computer networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a computer network (e.g., an Ethernet segment), and remote computer system 483 represents a node of the computer network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem), through which computer system 420 receives data from and/or transmits data to external sources. As depicted in FIG. 4, input/output interface 446 and modem 454 facilitate the exchange of data with remote computer system 493 via link 452. Link 452 represents a portion of a computer network and remote computer system 493 represents a node of the computer network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, management system modules, kiosks modules, payment register modules, and fuel dispenser modules, as well as associated data, including purchasing account information, payments, credits, and debits may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a computer network environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. At a retail kiosk that is network connectable to a purchasing account management system, the retail kiosk located at a retail location for use in purchasing items at the retail location, the purchasing account management system located separately from the retail location, the retail location having a retail account managed by the purchasing account management system, the purchasing account management system configured to electronically communicate with the retail kiosk via network communication, a method for purchasing items at the retail location, the method comprising:

an act of the retail kiosk receiving account credentials corresponding to a registered user purchasing account for a registered user of the separately located purchasing account management system, the registered user purchasing account having an account balance representing funds from previously cleared deposit transactions submitted to the separately located purchasing account management system, the previously cleared deposit transactions electronically depositing funds into the registered user purchasing account, the account balance indicating previously cleared funds allocated for direct transfer to other accounts within the separately located purchasing account management system to minimize the risks associated with settling transactions for the purchase of items without reference to external authorization or banking networks;

an act of the retail location submitting the received account credentials to the separately located purchasing account management system;

an act of the retail location receiving the account balance for the registered user purchasing account from the separately located purchasing account management system, the separately located purchasing account management system handling purchases for a variety of different, geographically remote retail locations, reception of the account balance indicating to the retail location that the registered user has an account with the purchasing account management system such that payment for purchased items is to be made from previously cleared funds so as to thereby further indicate to the retail location the minimized risk associated with settling transactions involving the registered user;

an act of configuring the retail kiosk to permit a user transaction to purchase items from the retail location based on the account balance for the registered user purchasing account;

an act of the retail kiosk calculating a total cost for one or more items, including a last item, that are to be purchased, including:

an act of receiving an indication of the cost of an item; and an act of adding the cost of the item to the total cost for the one or more items;

an act of detecting that a received indication of the cost of an item is the cost of the last item; and an act of the retail kiosk sending an electronic message to the separately located purchasing account management system to clear the transaction for purchasing the one or more items in response to detecting the last item, the electronic message indicating that the calculated total cost is to be debited from the balance of the registered user purchasing account and the calculated total cost is to be credited to the balance of the retail account, the electronic message indicating that previously cleared funds are to be transferred between accounts under the control of the purchasing account management system such that the transaction for purchasing the one or more items is cleared electronically and internally within the purchasing account management system without reference to any external authorization or banking networks.

2. The method as recited in claim 1, further comprising:

an act of receiving an indicator representative of a deposit amount to be credited to the registered user purchasing account; and an act of verifying the amount to be deposited to the registered user purchasing account.

3. The method as recited in claim 2, further comprising:

an act of receiving a guarantee for guaranteeing payment of the deposit amount.

4. The method as recited in claim 3, wherein the act of receiving a guarantee for guaranteeing payment of the deposit amount includes guaranteeing payment against a credit card.

5. The method as recited in claim 3, wherein the act of receiving a guarantee for guaranteeing payment of the deposit amount includes delaying availability of funds until an electronic check clears.

6. The method as recited in claim 3, wherein the act of receiving a guarantee for guaranteeing payment of the deposit amount includes guaranteeing the deposit amount against an interest bearing account.

7. The method as recited in claim 3, wherein the act of receiving a guarantee for guaranteeing payment of the deposit amount includes obtaining a third party verification.

8. The method as recited in claim 3, wherein the act of receiving a guarantee for guaranteeing payment of the deposit amount includes accessing a credit status of the purchasing account.

9. The method as recited in claim 2, further comprising:

an act of receiving a payment type from a consumer, the payment type indicating a method for receiving the deposit amount.

10. The method as recited in claim 9, wherein the user selects the type from a group consisting of: cash, credit card, debit card, paper check, and electronic check.

11. The method as recited in claim 10, wherein the act of sending a credit message to the account management system comprises an act of sending the credit message to a network address corresponding to the account management system, such that the credit message is transferred across the Internet.

12. The method as recited in claim 1, wherein the act of verifying the amount to be deposited comprises an act of at least one of receiving a verification from an attendant and receiving acknowledgement of receipt of the deposit amount.

13. The method as recited in claim 12, wherein the attendant verification is received in response to the attendant receiving a payment in the amount to be credited to the deposit account.

14. The method as recited in claim 1, wherein the act of receiving account credentials comprises an act of receiving a user-id and password.

15. The method as recited in claim 1, wherein the act of receiving account credentials includes an act of receiving at least one biometric indicator.

16. The method as recited in claim 1, wherein the registered user purchasing account has at least one photographic indicator stored therein.

17. The method as recited in claim 1, further comprising:
an act of creating the registered user purchasing account and the account credentials corresponding to the registered user purchasing account.

18. At a purchasing account management system that is network connectable to one or more computer systems, the one or more computer systems including one or more separately located retail kiosks, each retail kiosk controlling transactions for the purchase of items at a corresponding retail location, the purchasing account management system configured to electronically communicate with the one or more separately located retail kiosks via network communication, a method for clearing a transaction for the purchase items at a retail location, the retail location having a retail account managed by the purchasing account management system, the method comprising:
an act of the purchasing account management system receiving account credentials from a retail kiosk at a retail location, the account credentials indicative of an intent to initiate a transaction for purchasing one or more items at the retail location;
an act of the purchasing account management system identifying a registered user purchasing account assigned to the received account credentials, the registered user purchasing account previously registered to a registered user of the purchasing account management system, the registered user purchasing account having an account balance representing funds from previously cleared deposit transactions submitted to the purchasing account management system, the previously cleared deposit transactions electronically depositing funds into the registered user purchasing account, the account balance indicating funds available within the purchasing account management system to significantly reduce the risks associated with settling transactions for the purchase of items at the one or more separately located retail locations without reference to external authorization or banking networks;
an act of the purchasing account management system accessing account information for the registered user purchasing account from an account database;
an act of the purchasing account management system sending at least an account balance for the registered user purchasing account to the retail kiosk at the retail location, the account balance indicating to the retail location that the registered user has an account with the purchasing account management system such that payment for purchased items is to be made from previously cleared funds so as to further thereby indicate to the retail location the minimized risk associated with settling transactions involving the registered user;
an act of purchasing account management system receiving an electronic message from the retail kiosk, the electronic message indicating a total cost of a transaction for purchasing one or more items at the retail location, the electronic message also indicating that the purchase was made against the balance of the registered user purchasing account; and
in response to receiving the electronic message, an act of the purchasing account management system debiting the total cost from the account balance of the registered user purchasing account and crediting the total cost to the balance of the retail account so as to transfer funds between accounts under the control of the purchasing account management system such that the transaction for purchasing the one or more items is cleared electronically and internally within the purchasing account management system and the transaction is cleared without reference to any external authorization or banking networks.

19. The method as recited in claim 18, wherein the computer system is a kiosk.

20. The method as recited in claim 18, wherein the act of receiving an electronic message is performed in response to an attendant at a retail location receiving a cash payment.

21. The method as recited in claim 18, wherein the act of receiving an electronic message is performed in response to a consumer selecting a deposit type selected from a group consisting of: electronic check, credit card, and debit card.

22. The method as recited in claim 18, wherein the electronic message is received from the computer system over the Internet.

23. The method as recited in claim 18, further comprising:
an act of receiving a request for account information corresponding to the registered user purchasing account; and
an act of providing account history information to a user, the account history providing a history of multiple forms of payment.

24. The method as recited in claim 23, wherein the account history provides categorized purchase information, the purchase information including at least: purchase date, purchase location, purchase amount, and one or more of a group consisting of: items purchased and quantity purchased.

25. The method as recited in claim 24, wherein the act of crediting the registered user purchasing account makes funds almost immediately available to the consumer, while the computer system guarantees payment of the deposit amount.

26. At a retail kiosk that is network connectable to a purchasing account management system, the retail kiosk located at a retail location for use in purchasing items at the retail location, the purchasing account management system located separately from the retail location, the retail location having a retail account managed by the purchasing account management system, the purchasing account management system configured to remotely monitor and maintain contact with the retail kiosk via network communication, a method for purchasing products at the retail location, the method comprising:
an act of the retail kiosk receiving account credentials corresponding to a user purchasing account for a registered user of the separately located purchasing account management system, the user purchasing account having an account balance representing funds from previously cleared deposit transactions submitted to the separately located purchasing account management system, the previously cleared deposit transactions electronically depositing funds into the user purchasing account, the account balance indicating funds allocated for direct transfer to other accounts within the separately located purchasing account management system to minimize the risks associated with settling transactions for the purchase of items at retail locations without reference to external financial networks;

an act of the retail location submitting the received account credentials for the registered user purchasing account to the separately located purchasing account management system;

an act of the retail location receiving the account balance for the user purchasing account from the purchasing account management system, the separately located purchasing account management system handling item purchases for a variety of different, geographically remote retail locations, reception of the account balance indicating to the retail location that the registered user has a user purchasing account with the purchasing account management system such that payment for purchased items is to be made from previously cleared funds so as to thereby further indicate to the retail location the minimized risk associated with settling transactions involving the registered user;

an act of configuring the retail kiosk to permit a user transaction to purchase one or more items from the retail location based on the account balance for the registered user purchasing account;

an act of receiving monitoring from the separately located purchasing account management system to monitor the user transaction in essentially real time to assure that the account balance is sufficient to pay for each item as each item is included in the transaction so as to prevent the account balance from going below a limit;

an act of receiving an indication that the transaction is complete, the indication being either an indication from the user account management system that the account balance has reached the limit or an indication from the kiosk that all of the one or more items is included in the transaction;

an act of calculating the total cost of the items included in the transaction; and an act of sending a debit message to the separately located purchasing account management system in response to and upon completion of the transaction, the debit message sent to directly debit the total cost of the items from the account balance of the user purchasing account by transferring the total cost out of the user purchasing account to settle the transaction for the purchase of the one or more items, without reference to any other external authorization networks.

27. The method as recited in claim 26, wherein the act of configuring the retail kiosk to permit a user transaction to purchase one or more items from the retail location comprises an act of configuring the retail kiosk to scan items, and further comprising:

an act of submitting a payment to the purchasing management system prior to configuring the kiosk assembly to scan items, the amount of the payment being large enough to cover the price of a plurality of scanned items; and an act of receiving an indication that the payment was credited to the purchasing account.

28. The method as recited in claim 27, wherein the act of submitting a payment to the purchasing management system comprises an act of submitting one of a credit card number, a debit card, an electronic funds transfer, and a cash payment to the purchasing management system.

29. The method as recited in claim 27, further comprising:

an act of receiving a touch screen selection indicating that payment for one or more scanned items is to be debited from the user purchasing account prior to receiving the account credentials.

30. The method as recited in claim 26, wherein the act of receiving account credentials corresponding to a user purchasing account comprises an act of receiving an account holder identifier.

31. The method as recited in claim 26, wherein the act of submitting the account credentials to the purchasing management system comprises an act of sending the credentials to a network address corresponding to the purchasing management system such that the credentials are transferred across the Internet to the purchasing management system.

32. The method as recited in claim 26, wherein the act of receiving an account balance for the user purchasing account from the purchasing management system comprises an act of receiving an electronic message that was transferred over the Internet to the kiosk assembly.

33. The method as recited in claim 26, wherein the act of sending a debit message to the purchasing management system comprises an act of sending the debit message to a network address corresponding to the purchasing management system such that the debit message is transferred across the Internet to the purchasing management system.

34. The method as recited in claim 26, further comprising:

an act of submitting a request for account information corresponding to the user purchasing account;

an act of receiving account information for the user purchasing account from the purchasing management system; and an act of presenting the account information at a user-interface.

35. At a purchasing account management system that is network connectable to one or more retail kiosks, the one or more retail kiosks separately located from the purchasing account management system, each retail kiosk controlling the purchase of items at a retail location, the purchasing account management system configured to remotely monitor and maintain contact with retail kiosks at a plurality of different retail locations via network communication, a method for clearing a transaction for the purchase items at a retail location, the method comprising:

an act of the purchasing account management system receiving account credentials from a retail kiosk at a retail location, the account credentials being indicative of an attempt to purchase items against the balance of a purchasing account;

an act of the purchasing account management system identifying a corresponding purchasing account assigned to the received account credentials, the user purchasing account previously registered to a registered user of the purchasing account management system, the user purchasing account having an account balance representing funds from previously cleared deposit transactions submitted to the purchasing account management system, the previously cleared deposit transactions electronically depositing funds into the user purchasing account, the account balance indicating funds available within the purchasing account management system to significantly reduce the risks associated with settling transactions for the purchase of items at the plurality of different retail locations without reference to external financial networks;

an act of accessing purchasing account information for the user purchasing account from an account database;

an act of sending at least an account balance for the user purchasing account to the retail kiosk the account balance indicating to the retail location that the registered user has a user purchasing account with purchasing account management system such that payment for purchased items is to be made from previously cleared funds so as to further thereby indicate to the retail location the minimized risk associated with settling transactions involving the registered user;

an act of the purchasing account management system monitoring the purchasing of items at the retail location in essentially real time to assure that the account balance is sufficient to pay for the items as the items are included in a transaction so as to prevent the account balance from going below a limit;

if the account balance reaches the limit:
  an act of sending an indication to the retail location that the transaction is complete;

an act of purchasing account management system receiving a debit message from the retail kiosk in response to and upon completion of the transaction, the debit message for debiting a total cost of the items included in the transaction from the account balance of the user purchasing account; and an act of debiting the total cost of the items from user purchasing account in response to receiving the debit message by transferring the total cost out of the user purchasing account to settle the transaction for the purchase of the items, without reference to any external financial networks, wherein the purchasing account management system is configured to debit the user purchasing account for purchases made at any of a variety of different, geographically remote retail locations.

36. The method as recited in claim 35, further comprising:
an act of receiving a payment from a computer system, the amount of the payment being large enough to cover the price of one or more item purchases; and
an act of crediting the user purchasing account by the amount of the payment.

37. The method as recited in claim 36, wherein the act of receiving a payment from a computer system comprises an act of receiving a payment from a kiosk assembly.

38. The method as recited in claim 36, wherein the act of receiving a payment from a computer system comprises an act of receiving a transfer of funds from a second user purchasing account managed by the purchasing account management system.

39. The method as recited in claim 35, wherein the act of receiving account credentials from a kiosk assembly comprises an act of receiving an electronic message, containing the account credentials, that was transferred over the Internet.

40. The method as recited in claim 35, wherein the act of receiving account credentials from a retail kiosk comprises an act of receiving an account holder identifier.

41. The method as recited in claim 35, wherein the act of sending at least an account balance for the user purchasing account to the retail kiosk comprises an act of sending the account balance to an electronic address corresponding to a retail kiosk such that the account balance is transferred across the Internet to the retail kiosk.

42. The method as recited in claim 35, wherein the act of sending at least an account balance for the user purchasing account to the retail kiosk comprises an act of sending an activating command for activating advertisements at a retail kiosk along with the account balance.

43. The method as recited in claim 35, further comprising:
an act of receiving a Web based account sign-up request from a computer system;
an act of sending a Web based account sign-up screen to the computer system;
an act of receiving account information that was entered at the Web based account sign-up screen; and
an act of creating the user purchasing account based on the received account information.

44. The method as recited in claim 35, further comprising:
an act of receiving a request for account information corresponding to the user purchasing account; and
an act of sending account history information in response to the request.

* * * * *

UNITED STATES PATENT AND TRADEMARK OFFICE
CERTIFICATE OF CORRECTION

PATENT NO. : 7,600,692 B2  Page 1 of 1
APPLICATION NO. : 11/333956
DATED : October 13, 2009
INVENTOR(S) : Call et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this

Fifth Day of October, 2010

David J. Kappos
*Director of the United States Patent and Trademark Office*